(12) United States Patent
Li et al.

(10) Patent No.: US 12,374,916 B2
(45) Date of Patent: Jul. 29, 2025

(54) CHARGING METHOD AND POWER CONVERSION APPARATUS

(71) Applicant: CONTEMPORARY AMPEREX TECHNOLOGY (HONG KONG) LIMITED, Hong Kong (CN)

(72) Inventors: Zhanliang Li, Ningde (CN); Zhimin Dan, Ningde (CN); Yu Yan, Ningde (CN); Weiping Sun, Ningde (CN); Shuyun Xiong, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 558 days.

(21) Appl. No.: 17/547,691

(22) Filed: Dec. 10, 2021

(65) Prior Publication Data

US 2022/0239140 A1  Jul. 28, 2022

Related U.S. Application Data

(63) Continuation of application No. PCT/CN2021/074175, filed on Jan. 28, 2021.

(51) Int. Cl.
*H02J 7/00* (2006.01)

(52) U.S. Cl.
CPC .... *H02J 7/007192* (2020.01); *H02J 7/00034* (2020.01); *H02J 7/00711* (2020.01); *H02J 2207/20* (2020.01); *H02J 2310/48* (2020.01)

(58) Field of Classification Search
CPC ............. H02J 7/007192; H02J 7/00034; H02J 7/00711

(Continued)

(56) References Cited

U.S. PATENT DOCUMENTS 4,385,269 A * 5/1983 Aspinwall ......... H02J 7/007184
320/152
4,389,608 A * 6/1983 Dahl ......................... H02J 7/02
320/137

(Continued)

FOREIGN PATENT DOCUMENTS

CA 2128507 C 11/1998
CN 1619876 A 5/2005

(Continued)

OTHER PUBLICATIONS

Extended European Search Report dated Aug. 2, 2022 received in European Patent Application No. EP 21816303.8.

(Continued)

*Primary Examiner* — John T Trischler
(74) *Attorney, Agent, or Firm* — Scully, Scott, Murphy & Presser, P.C.

(57) ABSTRACT

A charging method includes: acquiring a state parameter of a power battery by a power conversion apparatus; setting a charging mode to a pulse charging mode by the power conversion apparatus when the battery temperature is lower than a first preset threshold; and converting charging power of a charging apparatus and then charging the power battery by the power conversion apparatus in the pulse charging mode. Through the technical solution, the power conversion apparatus acquires a battery temperature of the power battery, when the battery temperature is lower than the first preset threshold, the power conversion apparatus converts the charging power output by the charging apparatus, and outputs a pulse current to charge the tract battery, to prevent the charging apparatus directly charging the power battery in a low temperature, thereby ensuring the performance of the power battery.

20 Claims, 14 Drawing Sheets

(58) Field of Classification Search
USPC ........................................................ 320/137
See application file for complete search history.

(56) References Cited

U.S. PATENT DOCUMENTS

| | | | |
|---|---|---|---|
| 5,307,000 A | 4/1994 | Podrazhansky et al. | |
| 5,440,221 A * | 8/1995 | Landau | H01M 10/425 |
| | | | 320/155 |
| 5,525,892 A * | 6/1996 | Phommarath | H02J 7/00711 |
| | | | 320/155 |
| 5,548,200 A * | 8/1996 | Nor | B60L 53/11 |
| | | | 320/132 |
| 5,633,574 A * | 5/1997 | Sage | H01M 10/44 |
| | | | 320/152 |
| 5,666,006 A * | 9/1997 | Townsley | H02J 7/0024 |
| | | | 320/124 |
| 5,708,348 A * | 1/1998 | Frey | H02J 7/00711 |
| | | | 320/160 |
| 5,726,551 A * | 3/1998 | Miyazaki | B60L 53/57 |
| | | | 320/155 |
| 5,773,955 A * | 6/1998 | Hall | H02J 7/00711 |
| | | | 320/108 |
| 5,994,872 A * | 11/1999 | Hall | H02J 7/02 |
| | | | 320/108 |
| 6,137,265 A * | 10/2000 | Cummings | H02J 7/00711 |
| | | | 320/133 |
| 6,437,540 B2 * | 8/2002 | Sonobe | H02J 7/00714 |
| | | | 320/136 |
| 6,441,588 B1 * | 8/2002 | Yagi | B60L 58/27 |
| | | | 320/150 |
| 6,685,334 B2 * | 2/2004 | Kenny | H05B 47/13 |
| | | | 362/621 |
| 6,882,130 B2 * | 4/2005 | Handa | H02M 3/155 |
| | | | 320/135 |
| 7,176,654 B2 * | 2/2007 | Meyer | H02J 7/0069 |
| | | | 320/110 |
| 7,221,125 B2 * | 5/2007 | Ding | H02J 7/00711 |
| | | | 320/139 |
| 7,262,580 B2 * | 8/2007 | Meyer | H02J 7/0031 |
| | | | 320/141 |
| 7,321,219 B2 * | 1/2008 | Meyer | H02J 7/00047 |
| | | | 320/125 |
| 7,323,847 B2 * | 1/2008 | Meyer | H02J 7/0031 |
| | | | 320/110 |
| 7,425,816 B2 * | 9/2008 | Meyer | H01M 10/4207 |
| | | | 320/141 |
| 7,508,167 B2 * | 3/2009 | Meyer | H02J 7/0014 |
| | | | 320/135 |
| 7,550,873 B2 * | 6/2009 | Jiang | H02J 9/061 |
| | | | 307/64 |
| 8,018,198 B2 * | 9/2011 | Meyer | H02J 7/0069 |
| | | | 320/136 |
| 8,258,750 B2 * | 9/2012 | Yamada | H01M 10/44 |
| | | | 320/128 |
| 8,310,209 B2 * | 11/2012 | Bonkhoff | H02J 7/00 |
| | | | 320/141 |
| 8,334,675 B2 * | 12/2012 | Wang | H02J 7/007192 |
| | | | 320/129 |
| 8,368,357 B2 * | 2/2013 | Ghantous | H02J 7/00711 |
| | | | 320/157 |
| 8,378,626 B2 * | 2/2013 | Wang | H02J 7/00 |
| | | | 320/140 |
| 8,493,024 B2 * | 7/2013 | Kissel, Jr. | B60M 1/10 |
| | | | 320/109 |
| 8,525,479 B2 * | 9/2013 | Meyer | H02J 7/0013 |
| | | | 320/135 |
| 8,698,458 B2 * | 4/2014 | Kim | H02J 7/00711 |
| | | | 320/164 |
| 8,847,544 B2 * | 9/2014 | Ang | H02J 7/007192 |
| | | | 320/150 |
| 8,907,631 B1 * | 12/2014 | Gurries | G01K 13/00 |
| | | | 320/141 |
| 9,118,189 B2 * | 8/2015 | Meyer | H02J 7/00047 |
| 9,180,781 B2 * | 11/2015 | Tajima | B60L 7/14 |
| 9,219,368 B2 * | 12/2015 | Kurokawa | H02J 7/007182 |
| 9,331,364 B2 * | 5/2016 | Ramaswamy | H01M 10/052 |
| 9,409,487 B2 * | 8/2016 | Shao | B60L 53/665 |
| 9,469,202 B2 * | 10/2016 | Miglioranza | B60L 50/64 |
| 9,496,735 B2 * | 11/2016 | Sarkar | B60L 58/16 |
| 9,656,560 B2 * | 5/2017 | Lopez | B60L 58/24 |
| 9,673,657 B2 * | 6/2017 | van Lammeren | H02J 7/00712 |
| 9,751,419 B2 * | 9/2017 | Kwon | B60L 53/36 |
| 9,793,733 B2 * | 10/2017 | Hempel | H01M 10/443 |
| 9,806,561 B2 * | 10/2017 | Navarro | H02J 9/061 |
| 9,862,287 B2 * | 1/2018 | Tang | B60L 53/16 |
| 9,866,056 B2 * | 1/2018 | Ramaswamy | H01M 10/425 |
| 9,912,181 B2 * | 3/2018 | Gurries | H02J 7/007192 |
| 9,966,639 B2 * | 5/2018 | Hase | G01R 31/371 |
| 9,969,288 B2 * | 5/2018 | Ikeda | B60L 53/14 |
| 9,991,726 B2 * | 6/2018 | Small, Jr. | H02J 7/0071 |
| 10,008,864 B2 * | 6/2018 | Meyer | H02J 7/00711 |
| 10,084,333 B2 * | 9/2018 | Zeng | H02J 7/007 |
| 10,141,614 B2 * | 11/2018 | Johnson | H01M 10/46 |
| 10,166,882 B2 | 1/2019 | Yang et al. | |
| 10,181,727 B2 * | 1/2019 | Katano | H02M 3/04 |
| 10,186,887 B2 * | 1/2019 | Wang | B60L 58/12 |
| 10,193,366 B2 * | 1/2019 | Josephs | H02J 7/0013 |
| 10,195,950 B2 * | 2/2019 | Dow | B60L 53/305 |
| 10,256,512 B2 * | 4/2019 | Sun | H02J 7/007194 |
| 10,259,338 B2 * | 4/2019 | Bryngelsson | H01M 10/615 |
| 10,279,700 B2 * | 5/2019 | Takebayashi | B60L 58/13 |
| 10,374,443 B2 * | 8/2019 | Meyer | H02J 7/0048 |
| 10,505,389 B2 * | 12/2019 | Navarro | H02J 9/00 |
| 10,666,070 B2 * | 5/2020 | Meacham, II | H02J 7/007182 |
| 10,714,948 B2 * | 7/2020 | Meyer | H02J 7/007194 |
| 10,804,711 B2 * | 10/2020 | Sheeks | H01M 50/296 |
| 10,886,757 B2 * | 1/2021 | Zuo | H01M 10/425 |
| 10,933,767 B2 * | 3/2021 | Javaid | G06Q 20/322 |
| 10,985,576 B2 * | 4/2021 | Sheeks | G01R 31/392 |
| 10,998,751 B2 * | 5/2021 | Wan | H02J 50/80 |
| 11,063,446 B2 * | 7/2021 | Meyer | H02J 7/00036 |
| 11,075,524 B2 * | 7/2021 | Small, Jr. | H02J 7/00 |
| 11,177,676 B2 * | 11/2021 | Liu | B60L 53/14 |
| 11,179,824 B2 * | 11/2021 | Kondo | B24B 47/12 |
| 11,196,305 B2 * | 12/2021 | Lin | H02J 50/80 |
| 11,196,306 B2 * | 12/2021 | Wan | H02J 7/00034 |
| 11,201,509 B2 * | 12/2021 | Wan | H02J 7/0044 |
| 11,223,735 B2 * | 1/2022 | Hayashi | H04N 1/00904 |
| 11,299,057 B2 * | 4/2022 | Lemke | B60L 3/0046 |
| 11,322,936 B2 * | 5/2022 | Zhou | H02J 7/00 |
| 11,327,119 B2 * | 5/2022 | Pressas | H02J 7/00711 |
| 11,349,349 B2 * | 5/2022 | Lin | H02J 50/80 |
| 11,349,350 B2 * | 5/2022 | Lin | H02M 3/07 |
| 11,355,793 B2 * | 6/2022 | Yamamoto | B60L 50/64 |
| 11,372,604 B2 * | 6/2022 | Shimamura | G06F 3/1229 |
| 11,390,178 B1 * | 7/2022 | Wiegman | B60L 53/16 |
| 11,397,215 B2 * | 7/2022 | Ghantous | H02J 7/0047 |
| 11,397,216 B2 * | 7/2022 | Ghantous | H02J 7/007182 |
| 11,398,744 B2 * | 7/2022 | Sun | H02J 7/007192 |
| 11,404,896 B2 * | 8/2022 | Du | H02J 7/007188 |
| 11,437,865 B2 * | 9/2022 | Wan | H02J 7/00 |
| 11,440,429 B2 * | 9/2022 | Lim | B60L 50/61 |
| 11,485,517 B1 * | 11/2022 | Wiegman | H02J 7/00034 |
| 11,515,588 B2 * | 11/2022 | Du | H01M 10/633 |
| 11,515,736 B2 * | 11/2022 | Wan | H02J 50/12 |
| 11,523,510 B2 * | 12/2022 | Silha | H05K 1/18 |
| 11,540,429 B2 * | 12/2022 | Silha | H02J 7/0013 |
| 11,575,273 B2 * | 2/2023 | Rauner | B60L 53/62 |
| 11,616,382 B2 * | 3/2023 | Hale | H02J 7/007182 |
| | | | 320/141 |
| 11,646,597 B2 * | 5/2023 | Surampudi | H01M 10/486 |
| | | | 320/145 |
| 11,719,755 B2 * | 8/2023 | Pressas | H02J 7/04 |
| | | | 324/430 |
| 11,735,787 B2 * | 8/2023 | Zuo | H01M 10/486 |
| | | | 320/134 |
| 11,831,186 B2 * | 11/2023 | Sherstyuk | H02J 7/0071 |
| 11,855,468 B2 * | 12/2023 | Silha | H02J 7/0047 |
| 11,855,476 B2 * | 12/2023 | Shin | H02J 7/00032 |
| 11,876,197 B2 * | 1/2024 | Ling | B60L 58/27 |

(56) References Cited

U.S. PATENT DOCUMENTS

| | | | | |
|---|---|---|---|---|
| 2001/0011883 A1* | 8/2001 | Sonobe | H02J 7/0047 | 320/134 |
| 2002/0070710 A1* | 6/2002 | Yagi | B60L 58/27 | 320/150 |
| 2003/0202344 A1* | 10/2003 | Kenny | H05B 47/13 | 362/276 |
| 2004/0067740 A1* | 4/2004 | Handa | H02M 3/155 | 429/231.95 |
| 2004/0263119 A1 | 12/2004 | Meyer et al. | | |
| 2005/0099162 A1* | 5/2005 | Ding | H02J 7/00711 | 320/141 |
| 2006/0071634 A1* | 4/2006 | Meyer | H02J 7/0071 | 320/112 |
| 2006/0108975 A1* | 5/2006 | Meyer | H02J 7/00038 | 320/107 |
| 2006/0108983 A1* | 5/2006 | Meyer | H02J 7/0014 | 320/128 |
| 2007/0103109 A1* | 5/2007 | Meyer | H02J 7/0036 | 320/103 |
| 2007/0273334 A1* | 11/2007 | Meyer | H02J 7/0048 | 320/145 |
| 2008/0042621 A1* | 2/2008 | Miglioranza | H02J 7/1407 | 320/150 |
| 2009/0085528 A1* | 4/2009 | Yamada | H01M 10/44 | 320/160 |
| 2009/0153101 A1* | 6/2009 | Meyer | H02J 7/00038 | 320/119 |
| 2010/0225269 A1* | 9/2010 | Liu | H01M 10/44 | 320/134 |
| 2010/0270979 A1* | 10/2010 | Bonkhoff | H02J 7/00 | 320/145 |
| 2010/0320965 A1* | 12/2010 | Kissel, Jr. | B60L 53/32 | 320/109 |
| 2011/0106336 A1* | 5/2011 | Eikeland | B60L 53/11 | 348/148 |
| 2011/0273139 A1* | 11/2011 | Hofheinz | B60L 53/11 | 320/109 |
| 2012/0001596 A1* | 1/2012 | Meyer | H02J 7/00306 | 320/125 |
| 2012/0007547 A1* | 1/2012 | Kim | H02J 7/0069 | 320/150 |
| 2012/0025773 A1* | 2/2012 | Wang | H02J 7/00714 | 320/129 |
| 2012/0032648 A1* | 2/2012 | Ghantous | H02J 7/00 | 320/139 |
| 2012/0112696 A1* | 5/2012 | Ikeda | H01M 10/48 | 320/109 |
| 2012/0112703 A1* | 5/2012 | Xu | H02J 7/0013 | 320/145 |
| 2012/0319643 A1* | 12/2012 | Wang | H02J 7/00 | 320/107 |
| 2013/0058379 A1* | 3/2013 | Kim | H04B 5/72 | 455/69 |
| 2013/0193924 A1* | 8/2013 | Kurokawa | H02J 7/04 | 320/112 |
| 2013/0219084 A1* | 8/2013 | Wu | G06F 3/00 | 710/11 |
| 2013/0224528 A1* | 8/2013 | Johnson | B25F 5/008 | 429/7 |
| 2013/0229153 A1* | 9/2013 | Sarkar | B60L 3/04 | 320/137 |
| 2013/0249495 A1* | 9/2013 | Ang | H02J 7/04 | 320/134 |
| 2013/0335012 A1* | 12/2013 | Meyer | H02J 7/0013 | 320/107 |
| 2014/0035530 A1 | 2/2014 | Shao | | |
| 2014/0266068 A1* | 9/2014 | O'Brien | B60L 3/003 | 320/139 |
| 2014/0327406 A1* | 11/2014 | Hempel | H01M 10/443 | 320/129 |
| 2015/0008744 A1* | 1/2015 | Navarro | H02J 9/061 | 307/64 |
| 2015/0130423 A1* | 5/2015 | Tajima | B60L 53/22 | 320/137 |
| 2015/0137741 A1* | 5/2015 | Gurries | G01K 13/00 | 320/150 |
| 2015/0221990 A1* | 8/2015 | Ramaswamy | H01M 10/052 | 204/229.4 |
| 2015/0288213 A1* | 10/2015 | van Lammeren | H01M 10/486 | 320/153 |
| 2015/0340887 A1* | 11/2015 | Meyer | H02J 7/0045 | 320/112 |
| 2016/0023563 A1* | 1/2016 | Wang | B60L 58/24 | 320/152 |
| 2016/0031333 A1* | 2/2016 | Dow | B60L 53/38 | 307/10.1 |
| 2016/0089989 A1* | 3/2016 | Park | B60L 53/62 | 320/108 |
| 2016/0107534 A1* | 4/2016 | Ikeda | H01M 10/44 | 307/9.1 |
| 2016/0129799 A1* | 5/2016 | Kwon | B60L 53/38 | 320/108 |
| 2016/0152151 A1 | 6/2016 | Yang et al. | | |
| 2016/0159228 A1* | 6/2016 | Tang | B60L 53/22 | 307/10.1 |
| 2016/0167535 A1* | 6/2016 | Lopez | B60L 53/14 | 320/157 |
| 2016/0185234 A1* | 6/2016 | Miglioranza | B60L 50/64 | 320/150 |
| 2016/0204624 A1* | 7/2016 | Small, Jr. | H02J 7/0047 | 320/139 |
| 2016/0204625 A1* | 7/2016 | Josephs | H02J 7/0048 | 320/139 |
| 2016/0218522 A1* | 7/2016 | Ramaswamy | H01M 10/4242 | |
| 2017/0117595 A1* | 4/2017 | Hase | H01M 10/482 | |
| 2017/0136888 A1* | 5/2017 | Ricci | B60M 7/003 | |
| 2017/0136889 A1* | 5/2017 | Ricci | B60L 53/126 | |
| 2017/0201109 A1* | 7/2017 | Meacham, II | H02J 7/00304 | |
| 2017/0207634 A1 | 7/2017 | Katano et al. | | |
| 2017/0256961 A1* | 9/2017 | Zeng | G01R 31/3842 | |
| 2018/0034289 A1* | 2/2018 | Meyer | H02J 7/0013 | |
| 2018/0034315 A1* | 2/2018 | Navarro | H02J 9/061 | |
| 2018/0131043 A1* | 5/2018 | Johnson | H02J 7/0063 | |
| 2018/0134173 A1* | 5/2018 | Takebayashi | G01R 31/36 | |
| 2018/0162232 A1* | 6/2018 | Bryngelsson | B60L 9/00 | |
| 2018/0198101 A1* | 7/2018 | Sheeks | H02J 7/007192 | |
| 2018/0198294 A1* | 7/2018 | Sheeks | H02J 7/007194 | |
| 2018/0241098 A1* | 8/2018 | Kang | H02J 7/007182 | |
| 2018/0257492 A1* | 9/2018 | O'Hara | H02J 7/0032 | |
| 2018/0287404 A1* | 10/2018 | Small, Jr. | H02J 7/0047 | |
| 2018/0309304 A1* | 10/2018 | Meyer | H02J 7/0036 | |
| 2018/0339597 A1* | 11/2018 | Kruszelnicki | B60L 53/305 | |
| 2018/0339601 A1* | 11/2018 | Kruszelnicki | B60L 53/16 | |
| 2019/0027792 A1 | 1/2019 | Sun et al. | | |
| 2019/0072618 A1* | 3/2019 | Ghantous | H02J 7/005 | |
| 2019/0120910 A1* | 4/2019 | Ghantous | G01R 31/392 | |
| 2019/0140470 A1* | 5/2019 | Wan | H02J 7/00714 | |
| 2019/0262971 A1* | 8/2019 | Kondo | H01M 10/6551 | |
| 2019/0285703 A1* | 9/2019 | Juva | H02J 7/00047 | |
| 2019/0293723 A1* | 9/2019 | Pressas | H02J 7/04 | |
| 2019/0356142 A1* | 11/2019 | Meyer | H02J 7/00038 | |
| 2019/0356153 A1* | 11/2019 | Wan | H02J 7/0044 | |
| 2019/0356154 A1* | 11/2019 | Wan | H02J 7/00 | |
| 2019/0363550 A1* | 11/2019 | Zuo | H01M 10/425 | |
| 2019/0386516 A1* | 12/2019 | Wan | H02J 50/12 | |
| 2020/0014235 A1* | 1/2020 | Lin | H02J 7/007194 | |
| 2020/0021129 A1* | 1/2020 | Lin | H02J 50/12 | |
| 2020/0021148 A1* | 1/2020 | Lin | H04B 5/24 | |
| 2020/0036207 A1* | 1/2020 | Wan | H02M 3/07 | |
| 2020/0037474 A1* | 1/2020 | Silha | H02J 7/0013 | |
| 2020/0062140 A1* | 2/2020 | Zhou | B60L 50/64 | |
| 2020/0128672 A1* | 4/2020 | Silha | H02J 7/00047 | |
| 2020/0215929 A1* | 7/2020 | Javaid | B60L 53/38 | |
| 2020/0244079 A1* | 7/2020 | Meacham, II | H02J 7/00308 | |
| 2020/0259373 A1* | 8/2020 | Park | H02J 50/80 | |
| 2020/0343740 A1* | 10/2020 | Meyer | H02J 7/0048 | |
| 2020/0381784 A1* | 12/2020 | Yamamoto | H02J 7/007194 | |
| 2020/0381788 A1* | 12/2020 | Du | H01M 10/633 | |
| 2020/0406766 A1* | 12/2020 | Liu | H02J 7/00711 | |
| 2021/0001743 A1* | 1/2021 | Rauner | B60L 53/305 | |

(56) References Cited

U.S. PATENT DOCUMENTS

| | | | |
|---|---|---|---|
| 2021/0066947 A1* | 3/2021 | Du | H02J 7/007182 |
| 2021/0075069 A1* | 3/2021 | Zuo | H01M 10/63 |
| 2021/0188111 A1* | 6/2021 | Lemke | H01M 10/44 |
| 2021/0194264 A1* | 6/2021 | Hale | H02J 7/00711 |
| 2021/0194267 A1* | 6/2021 | Shin | H02J 7/0047 |
| 2021/0218263 A1* | 7/2021 | Sun | H01M 10/443 |
| 2021/0234381 A1* | 7/2021 | Sheeks | H02J 7/0029 |
| 2021/0306501 A1* | 9/2021 | Hayashi | H04N 1/00907 |
| 2021/0336450 A1* | 10/2021 | Meyer | H02J 7/00309 |
| 2021/0373819 A1* | 12/2021 | Shimamura | G06F 3/1236 |
| 2021/0384746 A1* | 12/2021 | Zeiler | B60L 58/16 |
| 2021/0399554 A1* | 12/2021 | Sherstyuk | H02J 7/0014 |
| 2022/0001764 A1* | 1/2022 | Lim | H01M 10/48 |
| 2022/0077518 A1* | 3/2022 | Ling | H01M 10/625 |
| 2022/0077712 A1* | 3/2022 | Surampudi | H02J 7/007194 |
| 2022/0173606 A1* | 6/2022 | Mihara | H01M 10/44 |
| 2022/0221521 A1* | 7/2022 | Pressas | H02J 7/0047 |
| 2022/0236333 A1* | 7/2022 | Liu | G01R 31/392 |
| 2022/0239120 A1* | 7/2022 | Sun | H02J 7/00032 |
| 2022/0239121 A1* | 7/2022 | Li | H02J 7/00036 |
| 2022/0239127 A1* | 7/2022 | Sun | B60L 53/31 |
| 2022/0239135 A1* | 7/2022 | Li | H02J 7/06 |
| 2022/0255336 A1* | 8/2022 | Li | H01M 10/48 |
| 2022/0314742 A1* | 10/2022 | Miyakoshi | B60L 58/12 |
| 2022/0317198 A1* | 10/2022 | Ghantous | H01M 10/44 |
| 2022/0407322 A1* | 12/2022 | Svedlund | H04B 3/542 |
| 2022/0407338 A1* | 12/2022 | Li | H02J 7/007192 |
| 2023/0046587 A1* | 2/2023 | Zou | H02J 7/0048 |
| 2023/0053872 A1* | 2/2023 | Wiegman | B60L 53/305 |
| 2023/0064624 A1* | 3/2023 | Huang | H02J 7/00712 |
| 2023/0070522 A1* | 3/2023 | Xiong | H01M 10/44 |
| 2023/0076134 A1* | 3/2023 | Xiong | H01M 10/44 |
| 2023/0170714 A1* | 6/2023 | Silha | H02J 7/0013, 320/107 |
| 2023/0231218 A1* | 7/2023 | Li | H01M 10/625, 429/62 |
| 2023/0299606 A1* | 9/2023 | Zuo | H02J 7/0048, 320/137 |
| 2024/0085489 A1* | 3/2024 | Sheeks | G01R 31/392 |

FOREIGN PATENT DOCUMENTS

| | | |
|---|---|---|
| CN | 102208699 A | 10/2011 |
| CN | 103117421 A | 5/2013 |
| CN | 104249629 A | 12/2014 |
| CN | 104578291 A | 4/2015 |
| CN | 105680541 A | 6/2016 |
| DE | 102017206334 A1 | 11/2017 |
| JP | 2008113550 A | 5/2008 |
| JP | 2016525326 A | 8/2016 |
| JP | 2016164851 A | 9/2016 |
| KR | 20160021443 A | 2/2016 |
| KR | 20180045694 A | 5/2018 |
| WO | 2005117231 A1 | 12/2005 |
| WO | 2011122946 A2 | 10/2011 |
| WO | 2014206368 A1 | 12/2014 |

OTHER PUBLICATIONS

Request for the Submission of an Opinion dated Aug. 9, 2023 received in Korean Patent Application No. KR 10-2021-7039412.
Office Action dated Nov. 21, 2023 received in European Patent Application No. 21816303.8.
Notice of Reasons for Refusal dated May 8, 2023 received in Japanese Patent Application No. JP 2021-574313.

* cited by examiner

CHARGING METHOD AND POWER CONVERSION APPARATUS

CROSS-REFERENCE TO RELATED APPLICATIONS

This application is a continuation of International Application No. PCT/CN2021/074175, filed on Jan. 28, 2021, the disclosure of which is hereby incorporated by reference in its entirety.

FIELD OF TECHNOLOGY

The present application relates to the field of power battery, and more specifically, relates to a charging method and a power conversion apparatus.

BACKGROUND

With the development of the society, an electrical vehicle, due to its advantages such as high environmental protection, low noise and low use cost, has a huge market prospect and can effectively promote emission reduction, be beneficial to social development and progress.

For the electric vehicle, a power battery technology is an important factor concerning its development. Due to the electrochemical characteristics of the power battery, in a low temperature environment, a direct current charging may have a big impact on the performance of the power battery, effecting the customer's car experience.

Therefore, how to ensure the battery performance of the power battery is a technical problem to be solved.

SUMMARY

Embodiments of the present application provide a charging method and a power conversion apparatus, which can ensure the battery performance of the power battery.

In a first aspect, a charging method is provided, which includes: acquiring a state parameter of a power battery by a power conversion apparatus, the state parameter including a battery temperature; setting a charging mode to a pulse charging mode by the power conversion apparatus when the battery temperature is lower than a first preset threshold; and converting charging power of a charging apparatus and then charging the power battery by the power conversion apparatus in the pulse charging mode, the pulse charging mode being a charging mode outputting a pulsed voltage or a pulsed current.

Through the technical solutions of the embodiment of the present application, the power conversion apparatus acquires the battery temperature of the power battery, when the battery temperature is low, for example lower than the first preset threshold, the charging mode is set to the pulse charging mode. In the pulse charging mode, the power conversion apparatus converts the charging power output by the charging apparatus, and outputs a pulse current to charge the power battery, to prevent impacting the performance of the power battery when the charging apparatus directly charges the power battery in low temperatures, thereby ensuring the performance of the power battery. In addition, with the technical solution of embodiments of the present application, there is no need to configure a thermal management system for the power battery. On the basis of reducing the overall cost of the power battery, the heating time for the power battery at low temperatures is saved, and the charging efficiency is improved.

In some possible implementations, the method further includes: switching the charging mode from the pulse charging mode to a direct current charging mode by the power conversion apparatus when the battery temperature is not lower than the first preset threshold; and transmitting the charging power of the charging apparatus to the power battery to charge the power battery by the power conversion apparatus in the direct current charging mode, where the direct current charging mode is a charging mode outputting constant voltage or constant current.

Through the technical solutions of the embodiment of the present application, the power conversion apparatus continually acquires the battery temperature of the power battery. When the battery temperature is high, for example not lower than a first preset threshold, the power conversion apparatus switches its charging mode from a pulse charging mode to a direct current charging mode. Further the power conversion apparatus directly transmits the charging power of the charging apparatus to the power battery to charge the power battery, thereby increasing the charging efficiency of the power battery at non-low temperature. Therefore, with the technical solutions of the embodiment of the present application, the power conversion apparatus can flexibly sets its charging mode on the basis of the battery temperature of the power battery, and improve the charging efficiency of whole charging process on the premise of ensuring the performance of the power battery.

In some possible implementations, the state parameter further includes: a battery voltage; and the setting the charging mode to a pulse charging mode by the power conversion apparatus when the battery temperature is lower than the first preset threshold, includes: setting the charging mode to the pulse charging mode by the power conversion apparatus when the battery temperature is lower than the first preset threshold and the battery voltage is lower than a second preset threshold.

Through the technical solutions of the embodiment of the present application, in addition to acquiring the battery temperature of the power battery, the power conversion apparatus also acquires the battery voltage of the power battery. The power conversion apparatus combines the information of both battery temperature and battery voltage to set its charging mode to a pulse charging mode, it can further determine whether the power battery is in a low voltage charging state under low temperature, which can further ensure charging safety.

In some possible implementations, the state parameter further includes: a battery voltage, and the switching the charging mode from the pulse charging mode to a direct current charging mode by the power conversion apparatus when the battery temperature is not lower than the first preset threshold, includes: switching the charging mode from the pulse charging mode to the direct current charging mode by the power conversion apparatus when the battery temperature is not lower than the first preset threshold or the battery voltage is not lower than a second preset threshold.

Through the technical solutions of the embodiment of the present application, the power conversion apparatus continually acquires the battery temperature of the power battery and battery voltage. The power conversion apparatus combines the information of both battery temperature and battery voltage to switch its charging mode from the pulse charging mode to a direct current charging mode. In the non-low temperature or non-low voltage state of the battery, the power conversion apparatus directly charges the rechargeable battery using a direct current, which can further improve the charging efficiency.

In some possible implementations, the state parameter further includes: a battery state of charge; and the setting a charging mode to a pulse charging mode by the power conversion apparatus, includes: sending first direct current charging information to the charging apparatus by the power conversion apparatus, the first direct current charging information being determined by the power conversion apparatus according to pulse charging information, where the pulse charging information includes at least one of the following information: pulse current information, pulse voltage information, pulse direction information, pulse frequency information and pulse time information, the pulse charging information is determined by the power conversion apparatus according to the battery temperature and the battery state of charge; the charging the power battery after converting charging power of a charging apparatus by the power conversion apparatus in the pulse charging mode, includes: outputting a pulse current to the power battery, where the pulse current is generated by converting a direct current based on the pulse charging information, the direct current is a direct current output to the power conversion apparatus by the charging apparatus according to the first direct current charging information.

Through the technical solutions of the embodiment of the present application, the power conversion apparatus can determine the corresponding pulse charging information according to the state parameter of the power battery it acquires. And the power conversion apparatus converts and acquires different pulse currents according to the pulse charging information, so as to adapt to the different charging requirements of the power battery in different situations, and has high flexibility and adaptability.

In some possible implementations, before setting a charging mode as a pulse charging mode by the power conversion apparatus, the method further includes: sending a charging prohibition message to the charging apparatus by the power conversion apparatus, the charging prohibition message being configured to indicate the charging apparatus to stop outputting a direct current to the power conversion apparatus.

In some possible implementations, after sending a charging prohibition message to the charging apparatus by the power conversion apparatus, the method further includes: conducting a pre-charging by the power conversion apparatus.

Through the technical solutions of the embodiment of the present application, after sending a charging prohibition message to the charging apparatus, the power conversion apparatus pre-charges a capacitor in the power conversion apparatus. In this way, during the subsequent charging process of the power battery, the capacitor may no longer cause a large pulse current, which can ensure normal charging process and charging safety.

In some possible implementations, the conducting a pre-charging by the power conversion apparatus, includes: acquiring a voltage difference between an input end and output end of the power conversion apparatus by the power conversion apparatus; conducting a pre-charging by the power conversion apparatus if the voltage difference is less than a third preset threshold.

Through the technical solutions of the embodiment of the present application, in order to protect the relay in the power conversion apparatus and to ensure the performance of the power conversion apparatus, before controlling the switch of the relay to pre-charge the power conversion apparatus, the power conversion apparatus may also acquire the voltage difference between its input end and output end, and judge whether the voltage difference is less than a third preset threshold, if the voltage difference is less than the third preset threshold, the power conversion apparatus conduct a pre-charging.

In some possible implementations, where the switching the charging mode from the pulse charging mode to a direct current charging mode by the power conversion apparatus, includes: stopping outputting a pulse current to the power battery by the power conversion apparatus; acquiring second direct current charging information of the power battery and sending the second direct current charging information to the charging apparatus by the power conversion apparatus; and the transmitting the charging power of the charging apparatus to the power battery to charge the power battery the power conversion apparatus, includes: outputting a direct current output by the charging apparatus according to second direct current charging information to the power battery to charge the power battery by the power conversion apparatus.

In some possible implementations, before stopping outputting a pulse current to the power battery by the power conversion apparatus, the method further includes: sending a charging prohibition message to the charging apparatus by the power conversion apparatus, the charging prohibition message being configured to indicate the charging apparatus to stop outputting a direct current to the power conversion apparatus.

In some possible implementations, the outputting a direct current output by the charging apparatus according to the second direct current charging information to the power battery to charge the power battery by the power conversion apparatus, includes: acquiring a voltage difference between an input end and an output end of the power conversion apparatus by the power conversion apparatus; outputting the direct current output by the charging apparatus according to second direct current charging information to the power battery to charge the power battery by the power conversion apparatus if the voltage difference is less than a fourth preset threshold.

Through the technical solutions of the embodiment of the present application, in order to protect the relay in the power conversion apparatus and ensure the performance of the power conversion apparatus, before controlling the switch of relay to output the direct current output by the charging apparatus to the power battery, the power conversion apparatus may also acquire the voltage difference between input end and output end thereof, and judge whether the voltage difference is less than a fourth preset threshold. If the voltage difference is less than the fourth preset threshold, the power conversion apparatus outputs a direct current output by the charging apparatus to the power battery to charge the power battery.

In some possible implementations, the acquiring a state parameter of a power battery by the power conversion apparatus includes: receiving the state parameter of the power battery sent by a battery management system of the power battery by the power conversion apparatus.

In a second aspect, a power conversion apparatus is provides, which includes: a control unit and a power unit; where the control unit is configured to acquire a state parameter of a power battery; the state parameter includes a battery temperature of the power battery; the control unit is configured to set a charging mode of the power unit as a pulse charging mode when the battery temperature is lower than a first preset threshold, the power unit is configured to convert charging power of a charging apparatus and then charge the power battery in the pulse charging mode, the pulse charging mode is a charging mode using pulsed voltage or pulsed current.

In some possible implementations, when the battery temperature is not lower than the first preset threshold, the control unit is further configured to: switch the charging mode of the power unit from the pulse charging mode to a direct current charging mode, and the power unit is configured to transmit the charging power of the charging apparatus to the power battery to charge the power battery in the direct current charging mode, where the direct current charging mode is a charging mode using a constant voltage or a constant current.

In some possible implementations, the state parameter further includes: a battery voltage, the control unit is configured to set the charging mode of the power unit to the pulse charging mode when the battery temperature is lower than the first preset threshold and the battery voltage is lower than a second preset threshold.

In some possible implementations, the state parameter further includes: a battery voltage, the control unit is configured to switch the charging mode of the power unit from the pulse charging mode to the direct current charging mode when the battery temperature is not lower than the first preset threshold or the battery voltage is not lower than the second preset threshold.

In some possible implementations, the state parameter further includes: a battery state of charge; the control unit is configured to determine the pulse charging information according to the battery temperature and the battery state of charge, and send the pulse charging information to the power unit, the pulse charging information including at least one of following information: pulse current, pulse voltage, pulse direction, pulse frequency and pulse time; the power unit is configured to determine first direct current charging information corresponding to the pulse charging information according to the pulse charging information, and send the first direct current charging information to the control unit; and the control unit is configured to send the first direct current charging information to the charging apparatus, and control the power unit output a pulse current to the power battery, where the pulse current is generated by converting a direct current based on the pulse charging information, the direct current is a direct current output to the power unit by the charging apparatus according to the first direct current charging information.

In some possible implementations, before the control unit is configured to set the charging mode of the power unit to the pulse charging mode, the control unit is further configured to: send a charging prohibition message to the charging apparatus, where the charging prohibition message is configured to indicate the charging apparatus to stop outputting a direct current to the power unit.

In some possible implementations, after the control unit is configured to send a charging prohibition message to the charging apparatus, the control unit is further configured to: send a precharge instruction to the power unit; and the power unit is configured to conduct a pre-charging according to the precharge instruction.

In some possible implementations, the control unit is configured to acquire a voltage difference between an input end and an output end of the power unit; and if the voltage difference is less than a third preset threshold, the control unit is configured to send the precharge instruction to the power unit.

In some possible implementations, the control unit is further configured to acquire second direct current charging information of the power battery; the control unit is configured to control the power unit to stop outputting a pulse current; and the control unit is configured to control the power unit to output a direct current output by the charging apparatus according to the second direct current charging information to the power battery.

In some possible implementations, before the control unit is configured to control the power unit to stop outputting a pulse current, the control unit is further configured to: send a charging prohibition message to the charging apparatus, the charging prohibition message is configured to indicate the charging apparatus to stop outputting the direct current to the power unit.

In some possible implementations, the control unit is configured to acquire a voltage difference between an input end and an output end of the power unit; and if the voltage difference is less than a fourth preset threshold, the control unit is configured to control the power unit to output the direct current output by the charging apparatus according to the second direct current charging information to the power battery.

In some possible implementations, the control unit is configured to receive the state parameter of the power battery sent by a battery management system of the power battery.

In a third aspect, a power conversion apparatus is provided, which includes: a processor and a memory, the memory is configured to store a computer program, the processor is configured to call the computer program, and execute the method in any possible implementation of the first aspect and the first aspect described above.

In a fourth aspect, a computer readable storage media is provided, which is configured to store a computer program, the computer program is configured to execute the method in any possible implementation of the first aspect and the first aspect described above.

BRIEF DESCRIPTION OF THE DRAWINGS

In order to more clearly illustrate the technical solution of embodiments of the present application, the accompanying drawings required in the embodiments of the present application will be introduced briefly, obviously, the accompanying drawings described below are merely some embodiments of the present application, those of ordinary skill in the art can also acquire other accompanying drawings according to the accompanying drawings without paying a creative work.

DETAILED DESCRIPTION OF THE EMBODIMENTS

Figure 1:
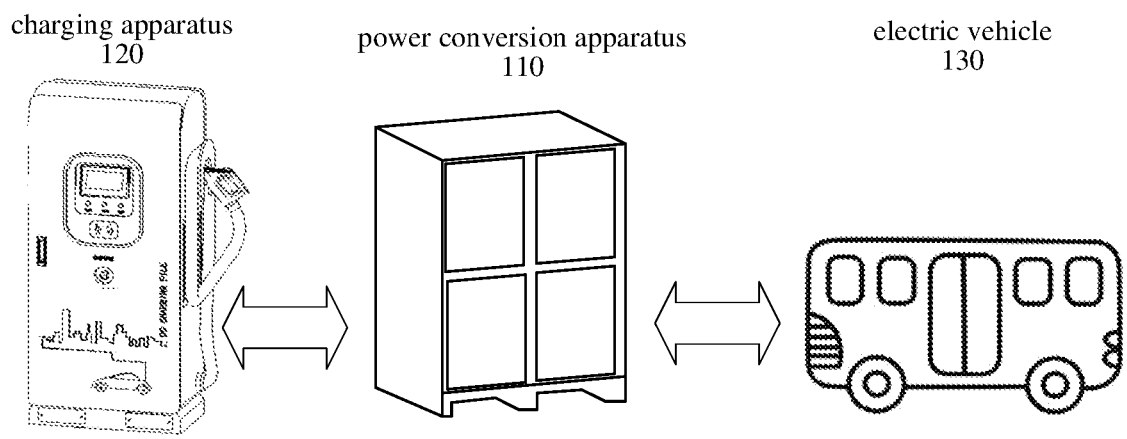
FIG. 1 is a schematic diagram of a charging system disclosed in one embodiment of the present application.

Implementations of the present application are described in further detail below in conjunction with the accompanying drawings and embodiments. The following detailed description of the embodiments and the accompanying drawings are used to illustrate the principles of the present application, but are not intended to limit the scope of the present application, i.e., the present application is not limited to the described embodiments.

In description of the present application, it should be noted that, unless otherwise noted, all technical and scientific terms used in the present application have the same meaning as usually understood by those skilled in the field to which the present application belongs to; the terms used in the specification of the present application are only for the purpose of describing the specific embodiments, and are not intended to limit the present application; the terms "include" and "have" and any variant thereof in the specification and claims of the present application and the above-mentioned accompanying drawings are intended to cover the non-exclusive inclusion. The terms "first", "second" etc. in specification and claims or the above-mentioned accompanying drawings of the present application are used to distinguish different objects, and not used to describe a particular order or a primary and secondary relation.

"Embodiment" mentioned in the present application means that, a specific feature, structure or characteristic described in conjunction with an embodiment can be included in at least one embodiment of the present application. The phrase presented at various locations of the specification does not necessarily refer to the same embodiment, and not the independent or alternative embodiment being mutually exclusive with other embodiments. Those skilled in the art can explicitly and implicitly understood that, the embodiments described in the present application can be combined with other embodiments.

In the description of the present application, it should also be noted that unless expressly specified and defined otherwise, the terms "mounted", "linked", "connected" and "attached" are understood in a broad sense, for example, it can be a fixed connection or a detachable connection, or being integrally connected; it can be being directly connected or connected through an intermediate medium. The specific meanings of the above terms in the present application will be understood by those of ordinary skill in the art depending on specific circumstances.

In the field of new energy, as the main power source of electrical devices, such as electrical vehicles, ships or spacecraft, the importance of power batteries is self-evident. Where the temperature of power battery has great influence on its performance, life, and safety. At present, most of the power batteries in the market are rechargeable batteries, and the common ones are lithium-ion batteries or lithium-ion polymer batteries. At low temperatures, lithium-ion batteries will experience increased internal resistance and reduced capacity, and extreme conditions will lead to electrolyte freezing and battery failure to discharge, which will greatly affect the low-temperature performance of the battery system, resulting in reduced power output and range of electric vehicles. Furthermore, direct current charging of lithium-ion batteries at low temperatures will cause phenomenon of lithium deposition. Lithium deposition not only degrades the performance of lithium batteries, greatly shortens the cycle life, but also limits the fast charging capacity of batteries, and may cause disastrous consequences such as combustion and explosion.

In order to solve the problem of charging electric vehicles in low temperature environment, most of the power batteries of electric vehicles in the market are equipped with a thermal management system. When the temperature of the power battery is too low, the thermal management system can convert a part of electric energy into heat energy, thereby heating the whole battery pack. This preheating method can make the power battery at a more suitable temperature, based on this, the power battery is charged. However, this preheating method is to charge the power battery after the temperature of the power battery is increased. The space for increasing the heating efficiency of the power battery is limited, and the heating time cannot be saved, which makes it impossible to fundamentally solve the problem that the charging time of electric vehicles is too long in a low-temperature environment. In addition, the configuration of thermal management system in the power battery will not only increase the weight of the power battery, but also increase the cost of the power battery.

In view of this, compared with the prior art, the present application provides a new charging system and a charging method thereof, which can solve the above charging problem of the electric vehicle in the low-temperature environment without using a thermal management system to preheat the power battery.

FIG. 1 illustrates a charging system to which embodiments of the present application apply. The charging system can be applied to various types of electrical devices including but not limited to electric vehicles and the like.

FIG. 1 shows a schematic diagram of a charging system 10 according to the present application.

As shown in FIG. 1, the charging system 10 may include: a power conversion apparatus 110, a charging apparatus 120 and an electric vehicle 130.

Specifically, the charging apparatus 120 is a device for supplementing electric energy for the electric vehicle 130 (including a pure electric vehicle and a pluggable hybrid electric vehicle), which can be divided into two categories: an alternative current charging apparatus and a direct current charging apparatus. Where the direct current charging apparatus directly charges the power battery of the electric vehicle by outputting adjustable direct current power, and the output voltage and current adjustment range are large, which can meet the demand of rapid charging. The alternative current charging apparatus only provides power output, but has no charging function. The subsequent rectification and direct current-direct current (DC-DC) conversion are completed by an on-board charger, and the charging apparatus serves as a power controller. In the embodiment of the present application below, the charging method of the present application is explained by using the charging apparatus as the direct current charging apparatus as an example, and the relevant charging method of the on-board charger can refer to the relevant description of the embodiments below.

Specifically, electric vehicle 130 may include battery system. At least one battery pack may be provided in the battery system to provide energy and power for the electric vehicle, and the at least one battery pack may be collectively referred to as a power battery. In terms of the type of battery, the power battery may be a lithium-ion battery, a lithium-metal battery, a lead-acid battery, a nickel-cadmium battery, a nickel-hydrogen battery, a lithium-sulfur battery, a lithium-air battery, a sodium-ion battery, and the like, which are not specifically limited in the embodiment of the present application. In terms of battery scale, the power battery in the embodiment of the present application may be a cell/battery cell, may also be a battery module or a battery pack, which is not specifically limited in the embodiment of the present application.

In addition, in order to intelligently manage and maintain the power battery, prevent over-charging and over-discharging of the battery, and prolong the service life of the battery, the battery system is generally provided with a battery management system (BMS) 122 for monitoring the state of the power battery. Optionally, the BMS may be integrated with the power battery in the same device/apparatus, or the BMS may be disposed outside the power battery as an independent device/apparatus.

Compared with the prior art, the charging system 10 is additionally provided with a power conversion apparatus 110. Specifically, the power conversion apparatus 110 may be electrically connected to the charging apparatus 120, and electrically connected to the battery system of the electric vehicle 130. The power conversion apparatus 110 can be used as a power transfer apparatus between the charging apparatus 120 and the battery system of the electric vehicle 130. Specifically, the power conversion apparatus 110 can be used as a power transfer apparatus between the charging apparatus 120 and the power battery of the electric vehicle 130.

Specifically, in the present application, the power conversion apparatus 110 is configured to receive first electric energy of a first power type transmitted by the charging apparatus 120, and convert it into second electric energy of a second power type different from the first power type, and then send the second electric energy to the power battery of the electric vehicle 130, to realize power conversion. As an example, the first electric energy of the first power type transmitted by the charging apparatus 120 is the direct current, the direct current can be a constant voltage direct current or a constant current direct current, and the power conversion apparatus 110 can convert the direct current into a second electric energy of other power types such as voltage change, current change, power state change, current, voltage, power timing change, etc., and then send the second electric energy to the power battery of the electric vehicle 130, to charge the power battery.

Optionally, as shown in FIG. 1, the power conversion apparatus 110 is used as an independent power transfer apparatus and is set outside the charging apparatus 120 and the electric vehicle 130. As an optional electrical connection manner, the charging apparatus 120 is provided with a first charging gun head, and the power conversion apparatus 110 is provided with a first charging socket corresponding to the first charging gun head to receive the electric energy transmitted from the charging apparatus 120. In addition, the power conversion apparatus 110 is also provided with a second charging gun head, the second charging gun head is configured to be electrically connected with a second charging socket on the electric vehicle 110, to realize power conversion apparatus 110 to transmit electric energy to the electric vehicle.

In order to adapt to the electrical connection between the existing charging apparatus 120 and the battery system of the electric vehicle 130, optionally, the specific type and structure of the second charging gun head on the power conversion apparatus 110 may be the same as the specific type and structure of the first charging gun head on the charging apparatus 120. Correspondingly, the specific type and structure of the first charging socket on the power conversion apparatus 110 may be the same as the specific type and structure of the second charging socket on the electric vehicle. Of course, the second charging gun head and the first charging socket on the power conversion apparatus 110 can also be different from the first charging gun head on the charging apparatus 120 and the second charging socket on the electric vehicle, the embodiment of the present application does not specifically limit this, and it is intended to realize the electrical connection between the charging gun head and the corresponding charging socket.

Optionally, in addition to being designed as an independent power conversion apparatus, the power conversion apparatus 110 can also be integrated in the charging apparatus 120 or integrated in the electric vehicle 130. Or part of the functional modules in the power conversion apparatus 110 is provided in the charging apparatus 120, and another part of the functional modules is provided in the electric vehicle 130. The embodiment of the present application also does not specifically limit the specific setting manner of the power conversion apparatus 110, and it is intended to be electrically connected between the charging apparatus 120 and the battery system of the electric vehicle 130 to achieve the function of power conversion.

Figure 2:
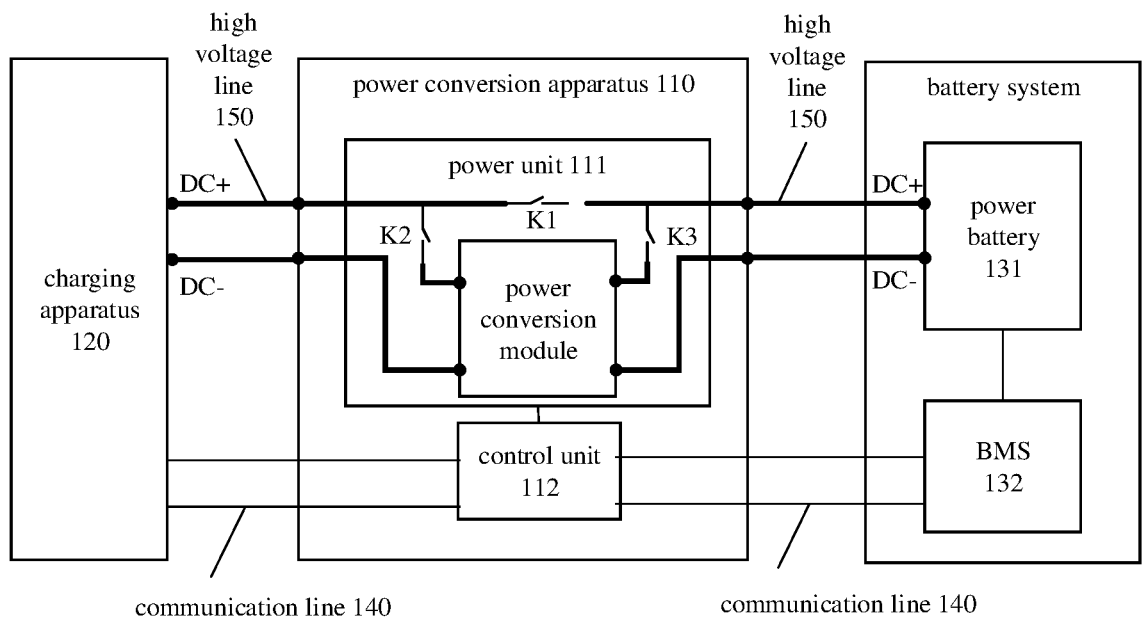
FIG. 2 is a schematic diagram of an application architecture of the charging system disclosed in one embodiment of the present application.

FIG. 2 is a schematic diagram of an application architecture of the above charging system 10 according to an embodiment of the present application.

As shown in FIG. 2, the battery system may be the battery system in the electric vehicle 130 in the above charging system 10, and the battery system includes a power battery 131 and a battery management system (BMS) 132.

Optionally, the power conversion apparatus 110 may include a power unit 111 and a control unit 112. The power unit 111 is configured to convert the power type output by the charging apparatus 120 into the power type required by the power battery 131. As an example, the power unit 111 may include a power conversion module, the power conversion module may include a pulse generating circuit used for generating a pulse current to provide the power battery 131. In addition, the power conversion module may also include other functional circuits such as a drive circuit, a communication circuit, a processing circuit and the like. The control unit 112 may include a controller and/or a processor, which are responsible for detecting the states of the charging apparatus 120 and the BMS 130 during the charging process, and controlling operations of other electrical components in the power unit 111 and the power conversion apparatus.

Specifically, the power unit 111 is separately connected with the charging apparatus 120 and the power battery 131 via a high voltage line 150, to convert the charging power output by the charging apparatus 120 through the high-voltage line 150 and output converted charging power to the power battery 131 to charge the power battery 131. As an example, as shown in FIG. 2, the power conversion module in the power unit 111 is separately connected with a positive electrode output port (for example: direct current positive electrode output port DC+) and a negative electrode output port (for example: direct current negative electrode output port DC−) of the charging apparatus through the high voltage line 150, and connected to the positive electrode output port and the negative electrode output port of the power battery.

Optionally, in addition to the power conversion module, the power unit 111 also includes at least one relay. For example, as shown in FIG. 2, the power unit 111 includes a first relay K1, a second relay K2 and a third relay K3. The power conversion module is respectively connected to the charging apparatus 120 and the power battery 131 through the second relay K2 and the third relay K3. It is possible to control whether the power conversion module is connected to the charging apparatus 120 and the power battery 131 by controlling the second relay K2 and the third relay K3.

In addition, the charging apparatus 120 and the power battery 131 are connected with each other through the first relay K1. In other words, if the second relay K2 and the third relay K3 are both disconnected, the first relay K1 is closed, the charging power output by the charging apparatus 120 may directly be transmitted to the power battery 131 at this time, without being converted by the power conversion module.

It should be noted that, the first relay K1, the second relay K2 and the third relay K3 in FIG. 2 are only schematic illustrative circuit structure, which can also be realized by replacement with other functional circuits. It is designed to realize the selective connection of the power conversion module between the charging apparatus 120 and the power battery 131.

It can be understood that, the first relay K1, the second relay K2 and the third relay K3 can be controlled by the control unit 112 in the power conversion apparatus 110.

It can also be understood that, the power unit 111 may not include the first relay K1, the second relay K2, and the third relay K3. Directly controlling the operating state of the power conversion module through software can also realize the selective connection of the power conversion module between the charging apparatus 120 and the power battery 131, so that the power conversion apparatus 110 is in different charging modes.

Further referring to FIG. 2, the charging apparatus 120 and the BMS 132 can also be separately connected to the power conversion apparatus 110 through a communication line 140, to realize an information interaction among the charging apparatus 120, the BMS 132 and the power conversion apparatus 110. Specifically, the control unit 112 is separately connected to the charging apparatus 120 and the BMS 130 through the communication line 140, to realize information interaction with the charging post 120 and the BMS 130 respectively. In addition, the control unit 112 is also connected to the power unit 111 through the communication line 140, to realize information interaction with the power unit 111, and control the power unit 111 to conduct a power conversion.

As an example, the communication line 140 includes but not limited to a control area network (CAN) communication bus or a daisy chain communication bus. Optionally, the charging apparatus 120, the BMS 132, the power conversion apparatus 110 may communicate based on the related protocol of physical layer, data link layer and application layer of CAN communication protocol or daisy chain communication protocol.

Specifically, in a conventional charging system on the market, an information interaction is directly conducted between the charging apparatus 120 and the BMS 132 via a communication protocol. In the embodiment of the present application, the power conversion apparatus 110 can receive and send notices and a message between the charging apparatus 120 and the BMS 132, in case of being compatible with present communication protocol between the charging apparatus 120 and BMS 132, the power conversion between the charging apparatus 120 and the BMS 132 is realized.

Figure 3:
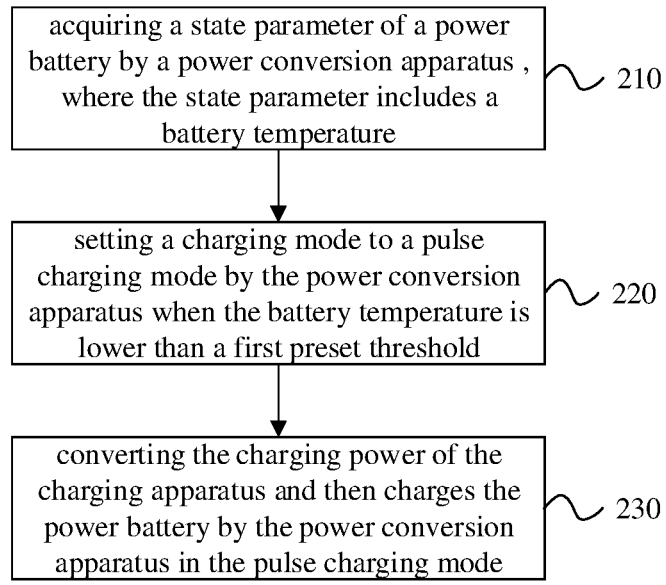
FIG. 3 is a schematic flow diagram of a method disclosed in one embodiment of the present application.

FIG. 3 a shows a schematic flow diagram of a charging method 200 provided by an embodiment of the present application. The method 200 is applied to a power conversion apparatus. For example, the power conversion apparatus can be a power conversion apparatus 110 in above FIG. 1 and FIG. 2.

As shown in FIG. 3, the charging method 200 may include the following steps.

Step 210: a power conversion apparatus acquires a state parameter of a power battery, where the state parameter includes a battery temperature.

Optionally, in this step, the power battery may be the power battery 131 shown in FIG. 2 above. The power battery generally includes at least one battery pack, every battery pack may include multiple battery cells connected in series or parallel. The battery temperature of the power battery includes but not limited to the temperature of every battery cell. In the related technologies, the battery cell may be also referred to as a battery core.

Optionally, in some implementations, the BMS of the power battery, such as BMS 132 shown in FIG. 2, is configured to detect the state parameter of the power battery, such as the battery temperature of the power battery, and transmit it to the power conversion apparatus, such that the power conversion apparatus acquires the state parameter of the power battery. As an example, a communication may be realized between the BMS and the power conversion apparatus based on CAN. In this example, the battery temperature of the power battery may be the minimum power storage battery temperature in the battery state message (BSM) sent by the BMS. In some other examples, the BMS can also communicate with the power conversion apparatus based on other communication protocols, the embodiment of the present application do not specifically limit this.

Of course, in some other implementations, the power conversion apparatus may also acquire the state parameter of the power battery by other manners. As an example, other control unit in an electric vehicle besides BMS is configured to acquire the state parameter of the power battery, then the state parameter of the power battery is transmitted to the power conversion apparatus by the control unit; or, as another example, BMS or other control unit in the electric vehicle stores the state parameter of the power battery into a storage unit or a cloud, the power conversion apparatus acquires the battery state parameter from the storage unit or the cloud, the embodiment of the present application do not specifically limit specific manner in which the power conversion apparatus acquires the state parameter of the power battery.

Step 220: the power conversion apparatus sets a charging mode to a pulse charging mode when the battery temperature is lower than a first preset threshold.

Specifically, in this step, the pulse charging mode is a charging mode using a pulsed voltage or a pulsed current, in other words, in the pulse charging mode, the power conversion apparatus may generate the pulsed voltage or the pulsed current.

Optionally, the operation state of each functional module in the power conversion apparatus may be controlled by controlling software programs and/or hardware circuits in the power conversion apparatus, such that the power conversion apparatus can convert the direct current electricity received from the charging apparatus to a pulse current electricity.

As an example, in the power conversion apparatus 110 shown in FIG. 2, the second relay K2 and the third relay K3 can be controlled to be closed, so that the power conversion module is connected between the charging apparatus 120 and power battery 131, such that the power conversion apparatus 110 can convert the direct current electricity received from charging apparatus 120 to a pulse current electricity.

Optionally, the above first preset threshold may be a preset arbitrary value, which intends to indicate that the power battery is in a low-temperature state. The first preset threshold can be correspondingly set according to the geographical position of the power battery, the battery type, attribute parameters, the system architecture of the power battery and other related factors, and the embodiments of the present application do not limit the specific value thereof. As an example, the first preset threshold may be any value below 10 degree centigrade (° C.), for example, the first preset threshold may be 5° C.

Step 230: the power conversion apparatus converts the charging power of the charging apparatus and then charges the power battery in the pulse charging mode.

Specifically, in this step, the power conversion apparatus is configured to realize a conversion of the charging power of the charging apparatus, and output the converted charging power to the power battery, so as to charge the power battery. Where, in the pulse charging mode, the charging power converted by the power conversion apparatus is a pulsed charging voltage or a pulsed charging current.

To sum up, through the technical solutions of the embodiment of the present application, the power conversion apparatus acquires a battery temperature of the power battery, when the battery temperature is low, for example, when it is lower than a first preset threshold, the charging mode of the power conversion apparatus is set to the pulse charging mode. In the pulse charging mode, the power conversion apparatus converts the charging power output by the charging apparatus and outputs pulsed electricity to charge the power battery, so as to prevent performance of the power battery from being affected by directly charging the power battery at a low temperature, thereby ensuring the performance of the power battery. In addition, through the technical solution of the embodiment of the application, the power battery does not need to be configured with a thermal management system, and on the basis of reducing the overall cost of the power battery, the heating time of the power battery at a low temperature is saved, and the charging efficiency is improved.

Figure 4:
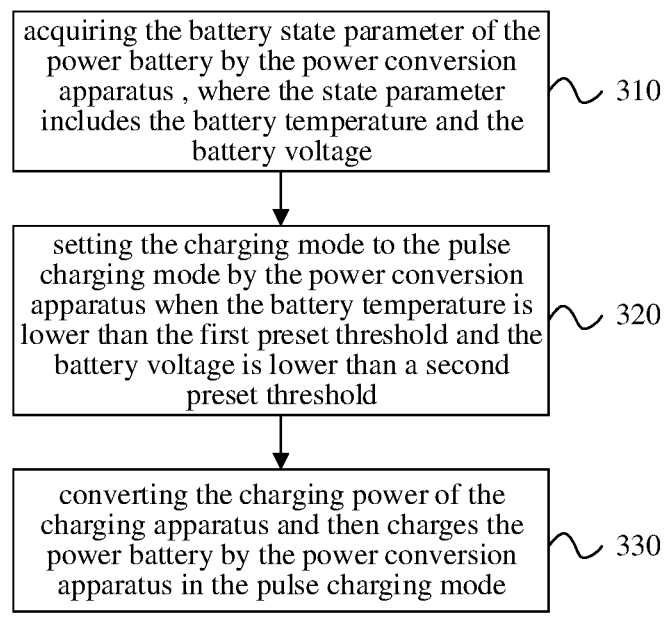
FIG. 4 is a schematic flow diagram of the charging method disclosed in another embodiment of the present application.

FIG. 4 shows a schematic flow diagram of another charging method 300 provided by an embodiment of the present application.

As shown in FIG. 4, the charging method 300 may include the following steps.

Step 310: the power conversion apparatus acquires the battery state parameter of the power battery, where the state parameter includes the battery temperature and the battery voltage.

Step 320: the power conversion apparatus sets the charging mode to the pulse charging mode when the battery temperature is lower than the first preset threshold and the battery voltage is lower than a second preset threshold.

Step 330: the power conversion apparatus converts the charging power of the charging apparatus and then charges the power battery in the pulse charging mode.

In the embodiment of the present application, compared with step 210 above, in step 310, the power conversion apparatus acquires the battery voltage of the power battery in addition to the battery temperature of the power battery.

Specifically, in the charging and discharging process of the power battery, besides the battery temperature has a great influence on it, detecting its voltage at the same time can better reflect the current charging and discharging state of the power battery, and prevent it from over-charging or over-discharging and causing permanent damage to the power battery.

Therefore, in the embodiments of the present application, the power conversion apparatus acquires the battery voltage of the power battery in addition to the battery temperature of the power battery, and judges the charging mode of the power battery by synthesizing various information, which improves the charging safety performance Specifically, the battery voltage of the power battery includes, but is not limited to, the voltage of each battery cell in the power battery and/or the total voltage of the entire power battery.

Similar to the power conversion apparatus to acquire the battery temperature of the power battery in the above step 210, in some implementations, the BMS of the power battery is configured to detect the battery voltage of the power battery, and transmit it to the power conversion apparatus, such that the power conversion apparatus acquires the battery voltage of the power battery. In the implementation, the battery voltage of the power battery may be transmitted to the power conversion apparatus via a battery charge state (BCS) message.

In step 320, when the battery temperature is lower than the first preset threshold and the battery voltage is lower than the second preset threshold, the power conversion apparatus sets the charging mode as the pulse charging mode. Optionally, the second preset threshold value may be a preset arbitrary value, which intends to indicate that the power battery is in a low-voltage state to be charged. The second preset threshold may be set to different values according to different power battery types and structures, which is not specifically limited in the embodiment of the present application.

Specifically, the related technical solutions of step 330 in the embodiment of the present application can refer to the related description of above step 230, it will not be repeated here.

In the technical solution of the embodiment of the present application, in addition to acquiring the battery temperature of the power battery, the power conversion apparatus also acquires the battery voltage of the power battery. Combining information on the two aspects of battery temperature and battery voltage, the charging mode is set to the pulse charging mode, and it is further judged whether the power battery is in a low-voltage state to be charged at low temperature, which can further ensure the charging safety.

It should be noted that, in the embodiment of the present application, in addition to acquiring the battery temperature of the power battery and the battery voltage, the power conversion apparatus can also acquire other state parameters of the power battery, and further sets its charging mode as the pulse charging mode according to other state parameters. Specifically, other state parameters of the power battery include but not limited to related parameters such as: battery current, battery state of charge (SOC), and estimated remaining charging time, etc. Where the SOC can be regarded as a thermodynamic quantity, which can be used to evaluate the potential electric energy of the battery In the charging methods of above FIG. 3 and FIG. 4, the power conversion apparatus sets its charging mode to the pulse charging mode, and converts the output power of the charging apparatus and outputs it to the power battery. Further, on the basis of that, the power conversion apparatus may also switch its charging mode into the direct current charging mode, and directly transmit the charging power of the charging apparatus to the power battery.

Figure 5:
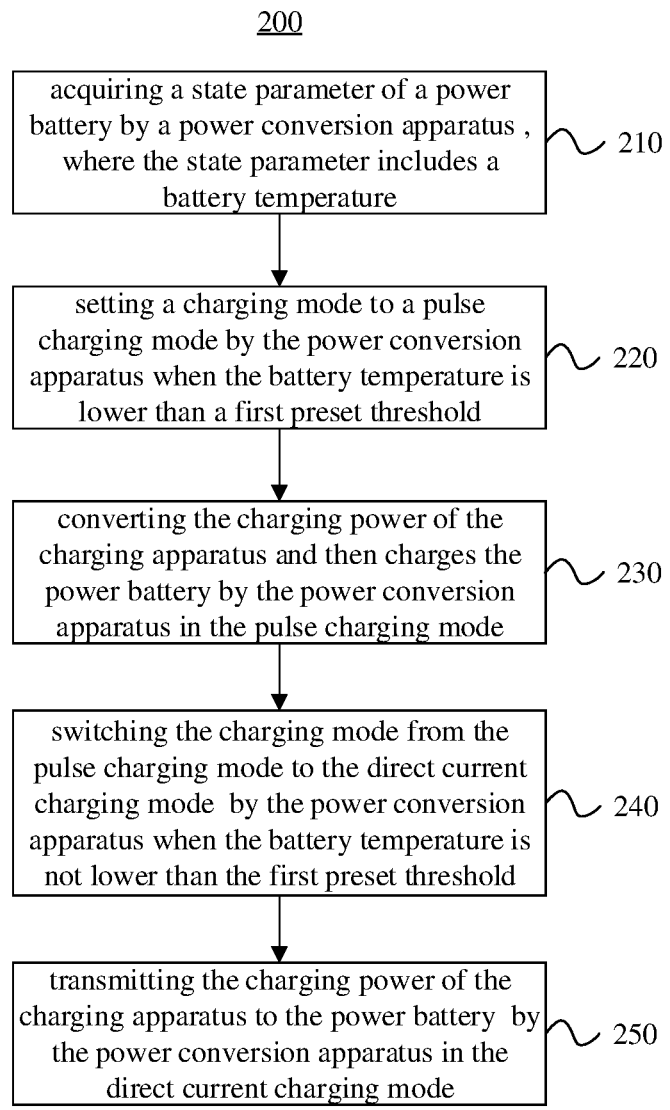
FIG. 5 is a schematic flow diagram of the charging method disclosed in another embodiment of the present application.

FIG. 5 shows a schematic flow diagram of another charging method 200 provided by an embodiment of the present application.

As shown in FIG. 5, the above charging method 200 may also include the following steps.

Step 240: the power conversion apparatus switches the charging mode from the pulse charging mode to the direct current charging mode when the battery temperature is not lower than the first preset threshold.

Step 250: the power conversion apparatus transmits the charging power of the charging apparatus to the power battery in the direct current charging mode.

Specifically, in the embodiment of the present application, the above steps 240 and 250 are conducted after step 230 in FIG. 3. If the battery temperature acquired by the power conversion apparatus in the current state is not lower than the first preset threshold, it means that the current power battery is in a non-low temperature state, and the charging mode of the power conversion apparatus can be switched from pulse charging mode to direct current charging mode. In the direct current charging mode, the power conversion apparatus directly transmits the charging power output by the charging apparatus to the power battery, to charge the power battery, where, the direct current charging mode is a charging mode which outputs a constant voltage or a constant current, in other words, the charging power of the charging apparatus is a constant voltage or a constant current.

As an example, the software programs and/or hardware circuits in the power conversion apparatus can be controlled to control the operating status of each functional module in the power conversion apparatus, so that the power conversion apparatus can directly output the direct current received from the charging apparatus to the power battery.

For example, in the power conversion apparatus 110 shown in FIG. 2, by controlling the second relay K2 and the third relay K3 to be disconnected, and controlling the first relay K1 to be closed, to achieve a direct electrical connection between the charging apparatus 120 and the power battery 131, so that the power conversion apparatus 110 can directly output the direct current received from the charging apparatus 120 to the power battery 131.

Furthermore, in the power conversion apparatus 110 shown in FIG. 2, the power conversion module can also be controlled to stop running to further enhance the reliability and flexibility in the charging mode switching process.

Through the technical solution of the embodiment of the present application, the power conversion apparatus can continuously acquire the battery temperature of the power battery, when the battery temperature is higher, for example, when the battery temperature is not lower than the first preset threshold, the power conversion apparatus switches its charging mode from pulse charging mode to direct current charging mode. Further, the power conversion apparatus directly transmits the charging power of the charging apparatus to the power battery to charge the power battery, and the charging efficiency of the power battery in the non-low temperature is improved. Therefore, through the technical solution of the embodiment of the present application, the power conversion apparatus can flexibly set its charging mode, and the charging efficiency of the whole charging process is improved on the premise of ensuring the performance of the power battery.

Figure 6:
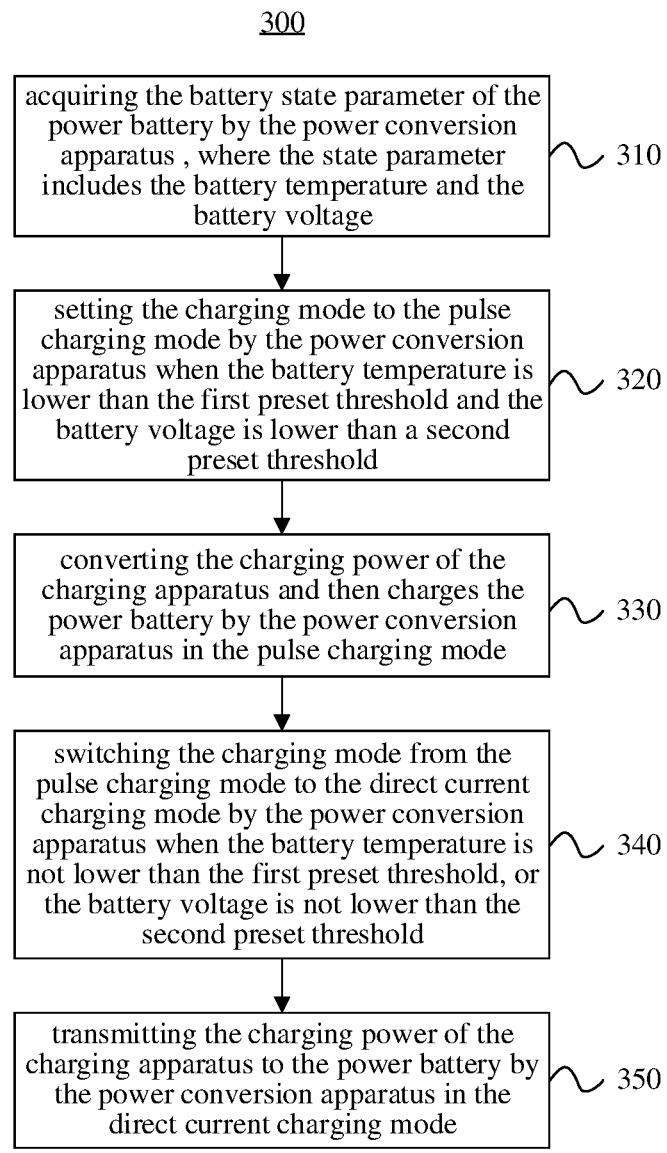
FIG. 6 is a schematic flow diagram of the charging method disclosed in another embodiment of the present application.

Similarly, FIG. 6 shows a schematic flow diagram of another charging method 300 provided by an embodiment of the present application.

As shown in FIG. 6, the above charging method 300 may also include the following steps.

Step 340: the power conversion apparatus switches the charging mode from the pulse charging mode to the direct current charging mode when the battery temperature is not lower than the first preset threshold, or the battery voltage is not lower than the second preset threshold.

Step 350: the power conversion apparatus transmits the charging power of the charging apparatus to the power battery in the direct current charging mode.

In the embodiment of the present application, the steps 340 and 350 are conducted after the above step 330 in FIG. 4. If the battery temperature acquired by the power conversion apparatus in the current state is not lower than the first preset threshold, it means that the current power battery is in a non-low temperature state, or if the battery voltage acquired by the power conversion apparatus in the current state is not lower than the second preset threshold, it means that the current power battery is not in the state to be charged, or is in the state to be charged with a higher voltage. The charging mode of the power conversion apparatus can be switched from pulse charging mode to direct current charging mode, and In the direct current charging mode, the charging apparatus charges the power battery through the power conversion apparatus.

Through the technical solutions of the embodiments of the present application, the power conversion apparatus continuously obtains the battery temperature and battery voltage of the power battery, and combines the information on the two aspects of the battery temperature and battery voltage to switch its charging mode from the pulse charging mode to the direct current charging mode. In the non-low temperature or non-low voltage state, direct current is configured to charge the rechargeable battery, which can further improve the charging efficiency.

It should be noted that, in the above application embodiments, in case that the power conversion apparatus is in the pulse charging mode, if the detected battery temperature is not lower than the first preset threshold, or the battery voltage is not lower than the second preset threshold, the power conversion apparatus need to switch its charging mode from the pulse charging mode to the direct current charging mode. In other application embodiments, in an initial state of the power conversion apparatus, namely, when the charging mode of the power conversion apparatus is not set, if the battery temperature of the power battery acquired by the power conversion apparatus is not lower than the first preset threshold or the battery voltage is not lower than the second preset threshold at this time, the power conversion apparatus can directly set its charging mode to the direct current charging mode.

In addition, it should also be noted that, in the above step 220 and step 320, in some cases, if the power conversion apparatus is in initial state, when the battery temperature is lower than the first preset threshold, or the battery temperature is lower than the first preset threshold and the battery voltage is lower than the second preset threshold, the power conversion apparatus directly set its charging mode to the pulse charging mode. In other cases, if the power conversion apparatus is in a direct current charging mode, when the battery temperature is lower than the first preset threshold, or the battery temperature is lower than the first preset threshold and the battery voltage is lower than the second preset threshold, the power conversion apparatus may switch its charging mode from the direct current charging mode into the pulse charging mode.

In conclusion, through the technical solutions of the embodiment of the present application, the power conversion apparatus can adjust its charging mode at any time according to the state parameter of the power battery during the entire charging process. Specifically, it is possible to realize pulse charging of the power battery at a low temperature, and direct current charging of the power battery at a non-low temperature, flexibly adapting to different charging environments, and improving charging efficiency.

Figure 7:
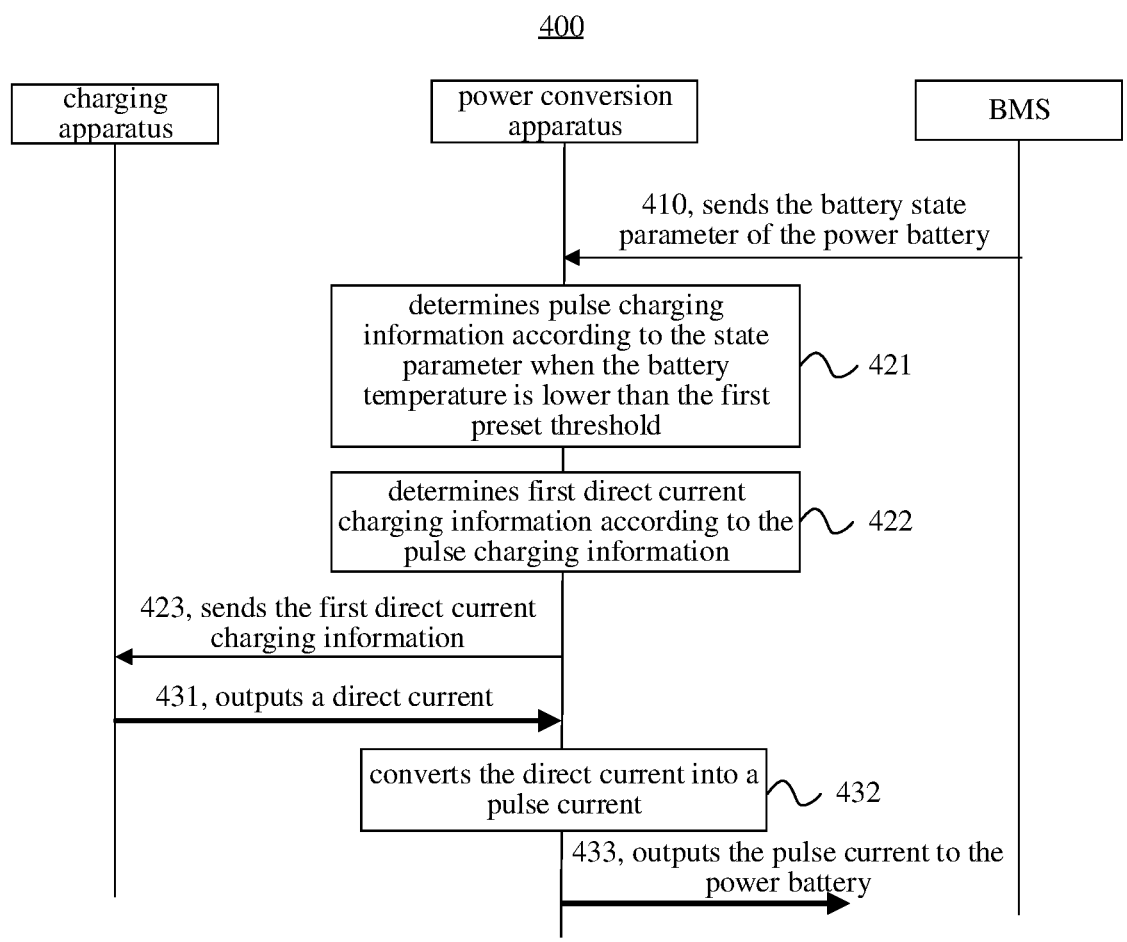
FIG. 7 is a schematic interaction flow diagram of the charging method disclosed in another embodiment of the present application.

FIG. 7 shows a schematic flow diagram of a charging method 400 of another embodiment provided by the present application.

As shown in FIG. 7, the charging method 400 may include the following steps.

Step 410: the battery management system (BMS) sends the battery state parameter of the power battery to the power conversion apparatus, where the state parameter includes battery temperature and battery state of charge.

Specifically, in this step, in addition to sending the battery temperature of the power battery to the power conversion apparatus, the battery management system (BMS) also sends battery state of charge (SOC) of the power battery. The SOC can accurately reflect the remaining electric quantity in the power battery. Optionally, the battery management system (BMS) can also send other parameters such as battery voltage of the power battery to the power conversion apparatus.

Optionally, in an embodiment of the present application, the battery temperature of the power battery may be sent to the power conversion apparatus via power storage battery state information message (BSM), and parameters such as battery state of charge (SOC), battery voltage of the power battery may be sent to the power conversion apparatus via battery charge state message (BCS).

Step 421: the power conversion apparatus determines pulse charging information according to the state parameter when the battery temperature is lower than the first preset threshold.

Specifically, in the step, when the battery temperature is lower than the first preset threshold, the pulse charging information jointly determined according to the battery temperature and the SOC by the power conversion apparatus can be adapted to both the current temperature of the power battery and the SOC of the power battery.

Or, in another implementation of the step, when the battery temperature is lower than the first preset threshold and the battery voltage is lower than the second preset threshold, the power conversion apparatus determines the pulse charging information according to the battery temperature and SOC jointly.

Optionally, determining pulse charging information according to the battery temperature and the SOC can be achieved in a variety of ways. As an example, the mapping relationship of the battery temperature, the SOC and the pulse charging information may be determined, and the specific pulse charging information is determined according to the mapping relationship. Where the mapping relationship can be a mapping relationship acquired by fitting a large number of experimental data, and the mapping relationship has a high reliability and accuracy. The mapping relationship may be specifically a mapping table, a mapping diagram or a mapping formula, and the like. In addition, in other examples, a special neural network model can be trained according to a large number of experimental data, and the neural network model can output pulse charging information according to the input battery temperature and SOC.

In some implementations, the above pulse charging information includes but not limited to: effective value of pulse current, peak value of pulse current, pulse voltage, pulse direction, pulse frequency, pulse interval and pulse duration.

Step 422: the power conversion apparatus determines first direct current charging information according to the pulse charging information.

Specifically, the power conversion apparatus can calculate the first direct current charging information corresponding to the pulse charging information according to the pulse charging information. The first direct current charging information may include at least one of the following information: charging demand voltage, charging demand current and charging demand mode. Where the charging demand mod can be a constant current mode or a constant voltage mode.

Step 423: the power conversion apparatus sends the first direct current charging information to the charging apparatus.

Optionally, in some implementations, the first direct current charging information can be sent to the charging apparatus as the charging demand of BMS. Optionally, the power conversion apparatus may send the first direct current charging information via a battery charging demand (BCL) message. Or, in other implementations, the first direct current charging information can also be sent to the charging apparatus via other messages, the embodiment of present application does not specifically limit the message type and the sending method.

Optionally, the above steps 421 to 423 may be the implementation manners included in step 220 in FIG. 3 above.

Step 431: the charging apparatus outputs a direct current to the power conversion apparatus.

Step 432: the power conversion apparatus converts the direct current into a pulse current.

Step 433: the power conversion apparatus outputs the pulse current to the power battery.

Optionally, the above steps 431 to 433 may be the implementation manners included in step 230 of above FIG. 3.

Specifically, during above steps, the charging apparatus outputs a direct current to power conversion apparatus, the power conversion apparatus is configured to convert the direct current into a pulse current, and output the pulse current to the power battery, so as to realize a pulse charging to the power battery. Where the pulse current is a pulse current generated by converting a direct current based on the above pulse charging information. The direct current is a direct current output by the charging apparatus to the power conversion apparatus based on the first direct current charging information above.

Through the technical solution of the embodiment of the present application, the power conversion apparatus may determine the corresponding pulse charging information according to the state parameter of the power battery acquired by it. And the power conversion apparatus converts different pulse currents according to the pulse charging information to adapt to the different charging requirements of the power battery in different situations, and has high flexibility and adaptability.

In can be understood that, the charging method 400 described in FIG. 7 above may be a schematic flowchart of a method for setting the charging mode of the power conversion apparatus to the pulse charging mode in the initial stage, that is, when the charging mode is not set.

Figure 8:
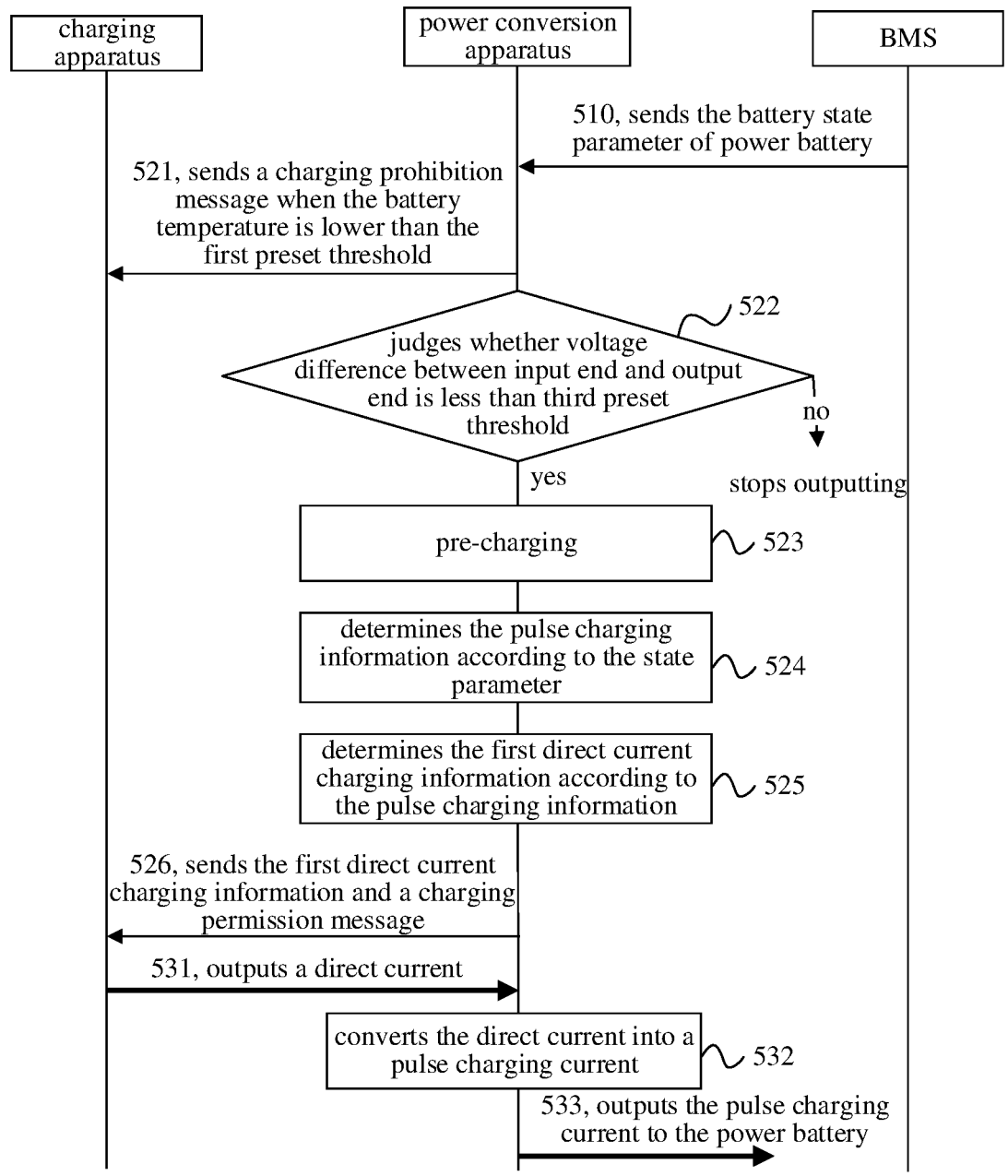
FIG. 8 is a schematic interaction flow diagram of the charging method disclosed in another embodiment of the present application.

In case that the power conversion apparatus switches its charging mode from the direct current charging mode to the pulse charging mode, or switches from other charging mode to the pulse charging mode, FIG. 8 shows a schematic flow diagram of a charging method 500 according to another embodiment of the present application.

As shown in FIG. 8, the charging method 500 may include the following steps.

Step 510: the battery management system (BMS) sends the battery state parameter of the power battery to the power conversion apparatus, where the state parameter includes battery temperature and battery state of charge.

Optionally, the battery management system (BMS) can also send other parameters such as battery voltage of the power battery to the power conversion apparatus.

Optionally, the related technical solution of step 510 may refer to the related description for step 410 in above FIG. 7, it will not be repeated here.

Step 521: the power conversion apparatus sends a charging prohibition message to the charging apparatus when the battery temperature is lower than the first preset threshold.

Specifically, in the step, the charging prohibition message is configured to indicate the charging apparatus to stop outputting the direct current to the power conversion apparatus.

Optionally, in another implementation of this step, when the battery temperature is lower than the first preset threshold and the battery voltage is lower than a second preset threshold, the power conversion apparatus sends a charging prohibition message to the charging apparatus.

Optionally, before step 521, the power conversion apparatus may send a battery charging lab (BCL) message to the charging apparatus. Specifically, in the demand message, the demand voltage may be a total voltage of the power battery, the demand current is set as the minimum current of the charging apparatus that can be output, for example, a current value of 10A.

Through the technical solution of the embodiment of the present application, before sending a charging prohibition message to charging apparatus, the power conversion apparatus first sends one small demand current to charging apparatus, then prohibits the output of the charging apparatus. Therefore, it is possible to prevent the charging prohibition message from being sent directly to the charging apparatus, which can quickly prohibit the charging apparatus from outputting current, and has less impact on the entire charging system.

Step 522: the power conversion apparatus acquires the voltage difference between its input end and output end, and judges whether the voltage difference is less than a third preset threshold.

Optionally, in this step, in the process of switching the charging mode of the power conversion apparatus from the direct current charging mode to the pulse charging mode, the switch control of the relay is involved. When the voltage difference between the input end and the output end of the power conversion apparatus is too large, it is easy to cause damage to the relay and affect the normal operation of the power conversion apparatus. Therefore, in order to protect the relay and to ensure the performance of the power conversion apparatus, before controlling the relay switch, the power conversion apparatus may also acquire voltage difference between its input end and output end, and judge whether the voltage difference is less than the third preset threshold. If the voltage difference is less than the third preset threshold, the power conversion apparatus execute the subsequent action. If the voltage difference is not less than the third preset threshold, the power conversion apparatus stops outputting, or, it can also wait for a period of time until the voltage difference is less than the third preset threshold. As an example, the third preset threshold includes but not limited to 10V.

Optionally, in some implementations, the power conversion apparatus may directly detect the voltage difference between its input end and output end, or, in some other implementations, the power conversion apparatus may receive a voltage value sent by the power battery and a voltage value sent by the charging apparatus, and the power conversion apparatus uses the voltage value sent by the power battery as the voltage of its output end, and the voltage value sent by the charging apparatus as the voltage of its input end.

Specifically, if the charging mode of the power conversion apparatus is switched from the direct current charging mode to the pulse charging mode, when the voltage difference between input end and output end of the power conversion apparatus is less than the third preset threshold, the relay state in the power conversion apparatus changes. For example, the second relay K2 and the third relay K3 in FIG. 2 are closed, then the following pre-charging step is executed.

Step 523: the power conversion apparatus conducts the pre-charging.

Specifically, in the power conversion module of the power conversion apparatus, there are capacitors with large-capacity in the charging high voltage circuit of the input end and the output end. At the moment when the power conversion module is connected to the high voltage circuit, the high voltage in the charging high-voltage circuit will charge the large-capacity capacitor and generate a pulsed large current. The pulsed large current may damage the device, such as a high voltage contactor in the power conversion apparatus or power battery.

Therefore, in the process of switching the power conversion apparatus from the direct current charging mode to the pulse charging mode, after the power conversion apparatus sends a charging prohibition message to the charging apparatus, the capacitor in the power conversion apparatus needs to be pre-charged first. Optionally, the capacitor can be pre-charged using the battery voltage of the power battery, so that in the subsequent charging process of the power battery, the capacitor will not cause a large pulse current. Thus, the normal progress of the charging process and the safety of charging can be ensured.

Further, if the pre-charging succeeds, a first relay K1 in FIG. 2 is disconnected, to disconnect the direct current connection between the charging apparatus and the power battery.

Step 524: the power conversion apparatus determines the pulse charging information according to the state parameter.

Step 525: the power conversion apparatus determines the first direct current charging information according to the pulse charging information.

Step 526: the power conversion apparatus sends the first direct current charging information and a charging permission message to the charging apparatus.

Specifically, in this step 526, in addition to sending the first direct current charging information to the charging apparatus, the power conversion apparatus also sends a charging permission message to the charging apparatus, the charging permission message is configured to indicate the charging apparatus can output a direct current.

Optionally, other related solutions of the above steps 524 to 526 may refer to related description of steps 421 to 423 in above FIG. 7, it will not be repeated here.

Step 531: the charging apparatus outputs a direct current to the power conversion apparatus.

Step 532: the power conversion apparatus converts the direct current into a pulse charging current.

Step 533: the power conversion apparatus outputs the pulse charging current to the power battery.

Optionally, the above steps 531 to 533 may refer to the related description on steps 431 to 433 in above FIG. 7, it will not be repeated here.

The above description in conjunction with FIG. 8 illustrates the related technical solution that the power conversion apparatus switches its charging mode from the direct current charging mode to the pulse charging mode in the embodiment of the present application. In the following, in conjunction with FIG. 9, a related technical solution for the power conversion apparatus to switch its charging mode from the pulse charging mode to the direct current charging mode in an embodiment of the present application will be described.

Figure 9:
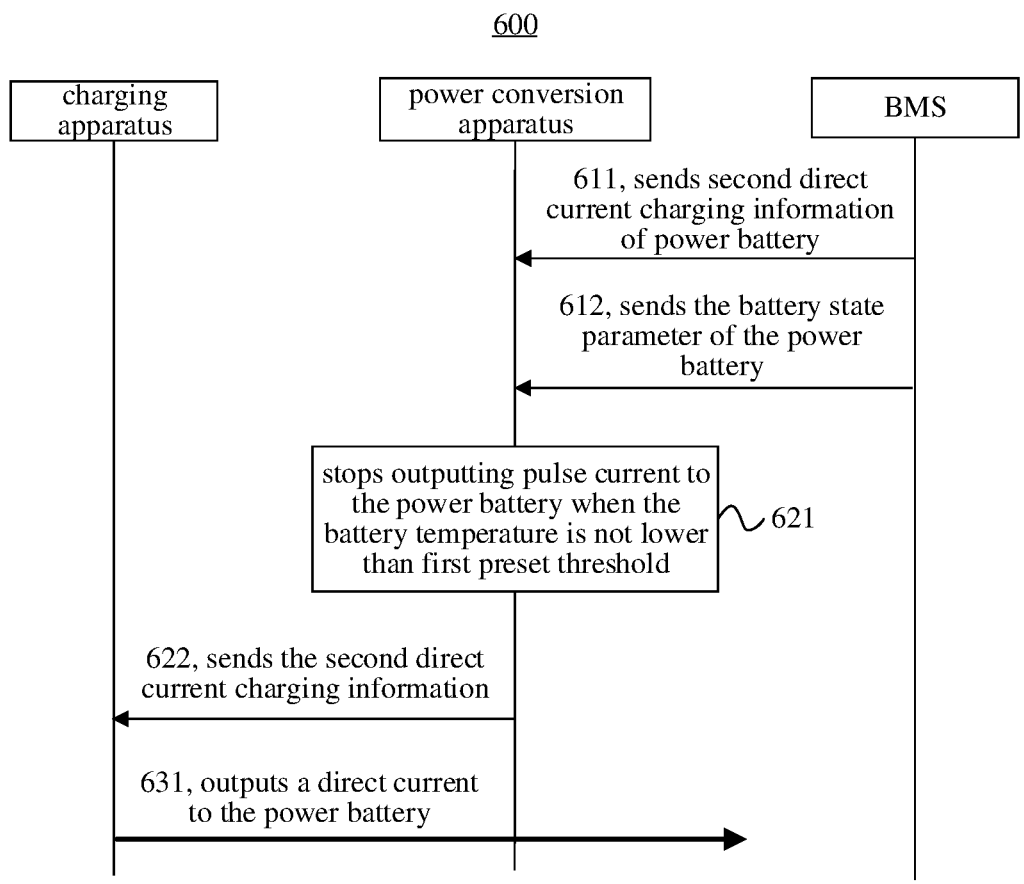
FIG. 9 is a schematic interaction flow diagram of the charging method disclosed in another embodiment of the present application.

FIG. 9 shows a schematic flow diagram of a charging method 600 of another embodiment of the present application.

As shown in FIG. 9, the charging method 600 may include the following steps.

Step 611: the battery management system (BMS) sends second direct current charging information of the power battery to the power conversion apparatus.

Optionally, in some implementations, the battery management system (BMS) may send the second direct current charging information of the power battery to the power conversion apparatus via the battery charging demand (BCL) message. The second direct current charging information is a charging information determined by the battery management system (BMS) according to the present state parameter of the power battery, and the second direct current charging information can include at least one of the following information: charging demand voltage, charging demand current and charging demand mode. Where the charging demand mod can be a constant current mode or a constant voltage mode.

Or, in some other implementations, the first direct current charging information can also be sent to the power conversion apparatus via other messages, the embodiment of the present application does not specifically limit the message type and sending method.

Step 612: the battery management system (BMS) sends the battery state parameter of the power battery to the power conversion apparatus, where the state parameter includes the battery temperature and the battery state of charge.

Optionally, the battery management system (BMS) can also send other parameters such as the battery voltage of the power battery to the power conversion apparatus.

Optionally, the related technical solution of step 612 may refer to the related description for step 410 in above FIG. 7, it will not be repeated here.

Step 621: the power conversion apparatus stops outputting pulse current to the power battery when the battery temperature is not lower than first preset threshold.

Specifically, in the step, when the battery temperature is not lower than the first preset threshold, it indicates that the present state of the power battery can receive the direct current, and the direct current charge may have no impact on the power battery. At this moment, the power conversion apparatus stops outputting the pulse electricity to the power battery, and realizes output of direct current to the power battery in the subsequent steps. Therefore when the battery temperature is not lower than the first preset threshold, the charging speed and charging efficiency of the power battery are improved.

Optionally, in another implementation of this step, when the battery temperature is not lower than the first preset threshold, or the battery voltage is not lower than the second preset threshold, the power conversion apparatus stops outputting the pulse current to the power battery.

It can be understood that, in this step, the operation state of the functional module in the power conversion apparatus can be controlled through communication signaling and software programs to realize that the power conversion apparatus stops outputting pulse current to the power battery.

It also can be understood that, in this step, the relay in the power conversion apparatus can also be controlled to realize that the power conversion apparatus stops outputting pulse current to the power battery. As an example, the third relay K3 in FIG. 2 can be controlled to be disconnected to realize that the power conversion apparatus stops outputting the pulse current to the power battery. Further, the second relay K2 and third relay K3 in FIG. 2 can be controlled to be disconnected to realize that the power conversion apparatus stops outputting the pulse current to the power battery.

Step 622: the power conversion apparatus sends the second direct current charging information to the charging apparatus.

Specifically, in this step, the power conversion apparatus directly retransmits the second direct current charging information sent by the above battery management system (BMS) to the charging apparatus. For example, the power conversion apparatus retransmits the above battery charging demand (BCL) message to the charging apparatus.

Optionally, the above step 612 and step 622 may be an implementation included in step 240 in above FIG. 5.

Step 631: the charging apparatus outputs a direct current to the power battery through the power conversion apparatus.

Specifically, in this step, by closing the first relay K1, and the second relay K2 and third relay K3 are disconnected, and a direct electrical connection between the charging apparatus and the power battery is realized, so that the charging apparatus outputs direct current to the power battery through power conversion apparatus, in other words, it can also be understood that the power conversion apparatus directly transmits the direct current of the charging apparatus to the power battery.

Specifically, in this step, the direct current output by the charging apparatus is a direct current output by the charging apparatus according to the above second charging information, which can meet the charging demand of the power battery.

Optionally, the above step 631 may be an implementation of step 250 included in above FIG. 5.

Figure 10:
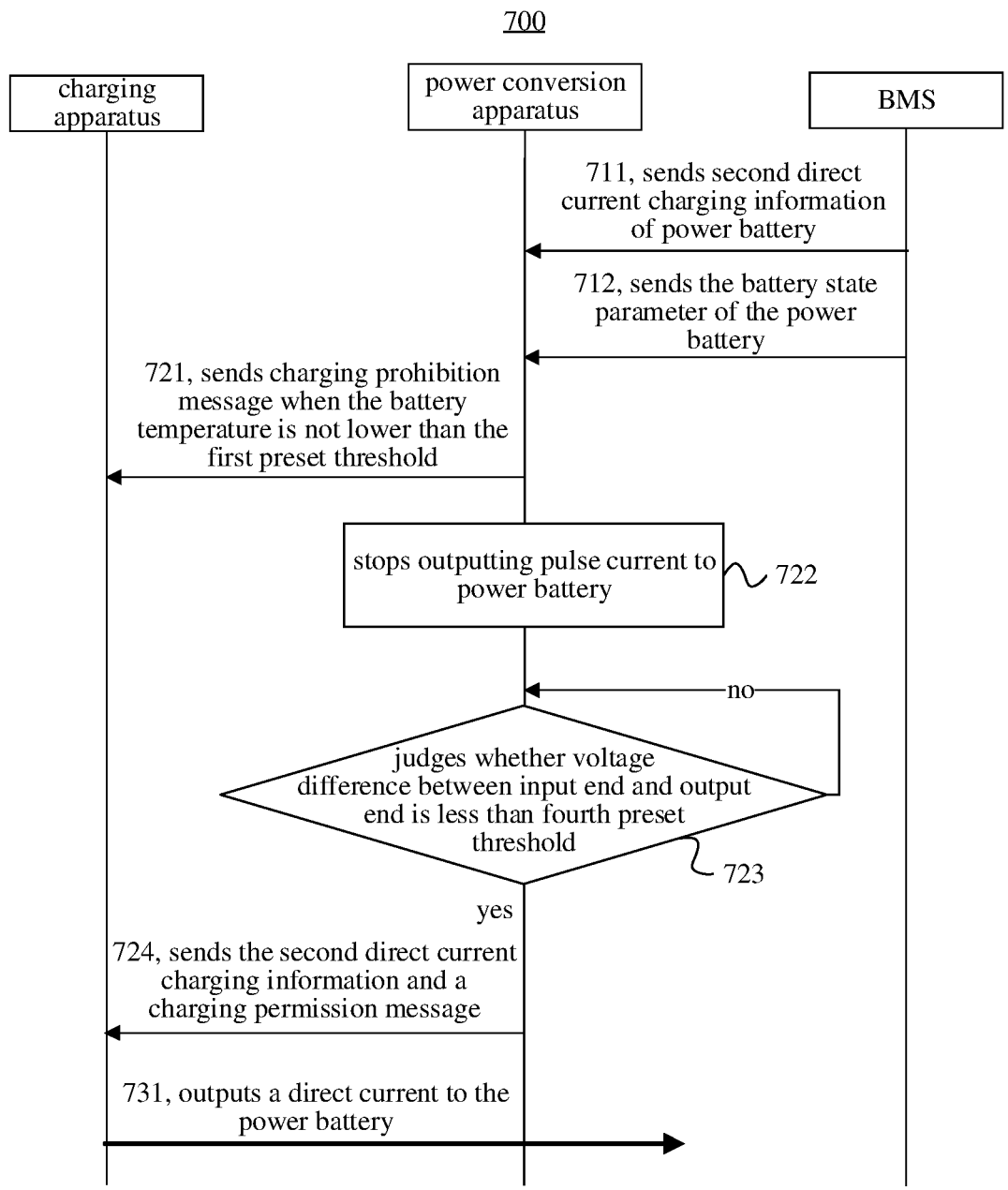
FIG. 10 is a schematic interaction flow diagram of the charging method disclosed in another embodiment of the present application.

FIG. 10 shows a schematic flow diagram of a charging method 700 of another embodiment of the present application.

As shown in FIG. 10, the charging method 700 may include the following steps.

Step 711: the battery management system (BMS) sends the second direct current charging information of the power battery to the power conversion apparatus.

Step 712: the battery management system (BMS) sends the battery state parameter of the power battery to the power conversion apparatus, where the state parameter includes the battery temperature and the battery state of charge.

Optionally, the battery management system (BMS) can also send other parameters such as the battery voltage of the power battery to the power conversion apparatus.

Step 721: the power conversion apparatus sends charging prohibition message to the charging apparatus when the battery temperature is not lower than the first preset threshold.

Specifically, in the step, the charging prohibition message is configured to indicate the charging apparatus to stop outputting the direct current to the power conversion apparatus.

Optionally, in another implementation of this step, when the battery temperature is not lower than the first preset threshold or the battery voltage is not lower than the second preset threshold, the power conversion apparatus sends a charging prohibition message to the charging apparatus.

Optionally, before step 721, the power conversion apparatus may send a battery charging demand (BCL) message to the charging apparatus. Specifically, in the demand message, the demand voltage may be a total voltage of the power battery, the demand current is set as the minimum current of the charging apparatus that can be output, for example, a current value of 10 A.

Through the technical solution according to the embodiment of the present application, before stopping outputting the pulse current to the power battery, the power conversion apparatus first sends one small demand current to the charging apparatus, then prohibits the output of the charging apparatus. Therefore, it is possible to prevent the charging prohibition message from being sent directly to the charging apparatus, which can quickly prohibit the charging apparatus from outputting current, and has less impact on the entire charging system.

Step 722: the power conversion apparatus stops outputting the pulse current to the power battery.

Specifically, in the step, the functional module in the power conversion apparatus stopping work can be controlled to stop, such that the power conversion apparatus stops outputting the pulse current to the power battery.

Step 723: the power conversion apparatus acquires a voltage difference between its input end and output end, and judges the voltage difference whether is less than a fourth preset threshold.

Optionally, in this step, in the process of switching the charging mode of the power conversion apparatus from the pulse charging mode to the direct current charging mode, the switch control of the relay is involved. When the voltage difference between the input end and the output end of the power conversion apparatus is too large, it is easy to cause damage to the relay and affect the normal operation of the power conversion apparatus. Therefore, in order to protect the relay and ensure the performance of the power conversion apparatus, before controlling the relay switch, the power conversion apparatus may also acquire voltage difference between its input end and output end, and judge whether the voltage difference is less than the fourth preset threshold. If the voltage difference is less than the fourth preset threshold, the power conversion apparatus executes the subsequent action. If the voltage difference is not less than the fourth preset threshold, the power conversion apparatus stops output, or, can also wait for a period of time until the voltage difference is less than the fourth preset threshold. As an example, the fourth preset threshold includes but not limited to 10V.

Specifically, if the charging mode of the power conversion apparatus is switched from the pulse charging mode to the direct current charging mode, when the voltage difference between the input end and the output end of the power conversion apparatus is less than the fourth preset threshold, the relay state in the power conversion apparatus changes. For example, in FIG. 2, the first relay K1 is closed, and the second relay K2 and third relay K3 are disconnected.

Further, when the voltage difference between the input end and the output end of the power conversion apparatus is less than the fourth preset threshold, and the first relay K1 is closed, the following step 724 and step 731 are executed.

Step 724: the power conversion apparatus sends the second direct current charging information and a charging permission message to the charging apparatus.

Specifically, in this step, in addition to sending the second direct current charging information to the charging apparatus, the power conversion apparatus also sends the charging permission message to the charging apparatus, where the charging permission message is use to indicate that the charging apparatus can output the direct current.

Step 731: the charging apparatus outputs a direct current to the power battery through the power conversion apparatus.

Specifically, in this step, when the voltage difference between the input end and the output end of the power conversion apparatus is less than the fourth preset threshold, the power conversion apparatus outputs the direct current output by the charging apparatus according to the above second direct current charging information to the power battery to charge the power battery, which can meet the charging demand of the power battery.

Optionally, related solutions of the embodiment of the present application may refer to the related description in above FIG. 9, it will not be repeated here.

In the foregoing, the power conversion apparatus is used as the execution subject to describe various embodiments of the charging method provided in the present application. The following describes the charging process of the power conversion apparatus by taking the power conversion apparatus including the control unit and the power unit as an example. For example, the power conversion apparatus may be power conversion apparatus 110 in FIG. 2, and includes a control unit 112 and a power unit 111.

Figure 11:
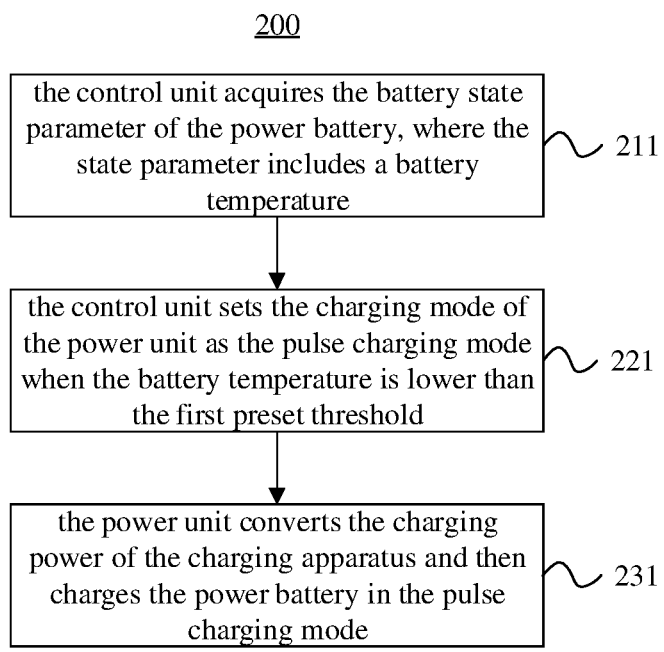
FIG. 11 is a schematic flow diagram of the charging method disclosed in another embodiment of the present application.

FIG. 11 shows a schematic flow diagram of charging method of the power conversion apparatus according to another embodiment of the present application. The power conversion apparatus is used for power conversion between the charging apparatus and the power battery, and the power conversion apparatus includes a control unit and a power unit.

Referring back to the charging method 200 shown in FIG. 3 above, FIG. 11 shows another schematic flowchart diagram of the charging method 200 provided by an embodiment of the present application.

As shown in FIG. 11, the above step 210 may include step 211: the control unit acquires the battery state parameter of the power battery, where the state parameter includes a battery temperature.

The above step 220 may include step 221: the control unit sets the charging mode of the power unit as the pulse charging mode when the battery temperature is lower than the first preset threshold.

Specifically, in this step, in the pulse charging mode, control unit controls the operation of the power unit, such that power unit may generate a pulsed voltage or pulsed current.

Optionally, the control unit controls the software program and/or hardware circuit in the power unit to control the operating state of the power unit so that the power unit can convert the direct current electricity received from the charging apparatus into pulsed electricity.

As an example, in the power conversion apparatus 110 shown in FIG. 2, the control unit controls the second relay K2 and the third relay K3 to close, and control the first relay K1 to be disconnected, to realize that the power conversion module is connected between the charging apparatus 120 and the power battery 131, the power conversion module is operated, and the direct current electricity received from the charging apparatus is converted into pulse current electricity.

The above step 230 may include step 231: the power unit converts the charging power of the charging apparatus and then charges the power battery in the pulse charging mode.

Specifically, in this step, the power unit in the power conversion apparatus is configured to convert the charging power of the charging apparatus and output the converted charging power to the power battery to charge the power battery. Where, in the pulse charging mode, the charging power converted by the power conversion apparatus is a pulsed charging voltage or a pulsed charging current.

Specifically, in the embodiment of the present application, the power conversion apparatus uses the pulse charging mode to charge the power battery through the cooperation of the control unit and the power unit. For the specific solution, please refer to the related description in FIG. 3 above, which will not be described in detail here.

Similarly, with respect to the method 200 shown in FIG. 5 above, the above step 240 may include: when the battery temperature is not lower than the first preset threshold, the control unit switches the charging mode of the power unit from the pulse charging mode to the direct current charging mode.

Specifically, in this step, in the direct current charging mode, the control unit controls the operation of the power unit, such that the power unit can output a constant voltage or a constant current.

As an example, the control unit can control the operating state of each functional module in the power unit by controlling the software program and/or hardware circuit in the power unit, so that the power unit can directly output the direct current received from the charging apparatus to the power battery.

For example, in the power conversion apparatus 110 shown in FIG. 2, the control unit can control the second relay K2 and the third relay K3 to be disconnected, and control the first relay K1 to be closed, so as to realize a direct electrical connection between a charging apparatus 120 and a power battery 131, such that the power unit 111 can directly output direct current received from the charging apparatus 120 to the power battery 131.

Furthermore, in the power conversion apparatus 110 shown in FIG. 2, the control unit can also control the power conversion module to stop operation, to further enhance the reliability and the flexibility in the charging mode switching process.

The above step 250 may include step 251: the power unit transmits charging power of the charging apparatus to the power battery in the direct current charging mode.

Similarly, with respect to the method 300 shown in above FIG. 4 and FIG. 6, the above step 310 may include step 311: the control unit acquires the battery state parameter of the power battery, where the state parameter includes battery temperature and battery voltage.

The above step 320 may include step 321: the control unit sets the charging mode of the power unit as pulse charging mode when the battery temperature is lower than the first preset threshold and the battery voltage is lower than the second preset threshold.

The above step 330 may include step 331: the power unit converts the charging power of the charging apparatus and then charges the power battery in the pulse charging mode.

The above step 340 may include step 341: the control unit switches charging mode of the power unit from the pulse charging mode into the direct current charging mode when battery temperature is not lower than first preset threshold, or the battery voltage is not lower than the second preset threshold.

The above step 350 may include step 351: the power unit transmits charging power of the charging apparatus to the power battery in the direct current charging mode.

Specifically, in the embodiment of the present application, the power conversion apparatus realizes that the pulse charging mode is switched to the direct current charging mode to charge the power battery through the cooperation of the control unit and the power unit. For specific solutions, please refer to the related descriptions in FIGS. 4 to 6 above, which will not be described in detail here.

Figure 12:
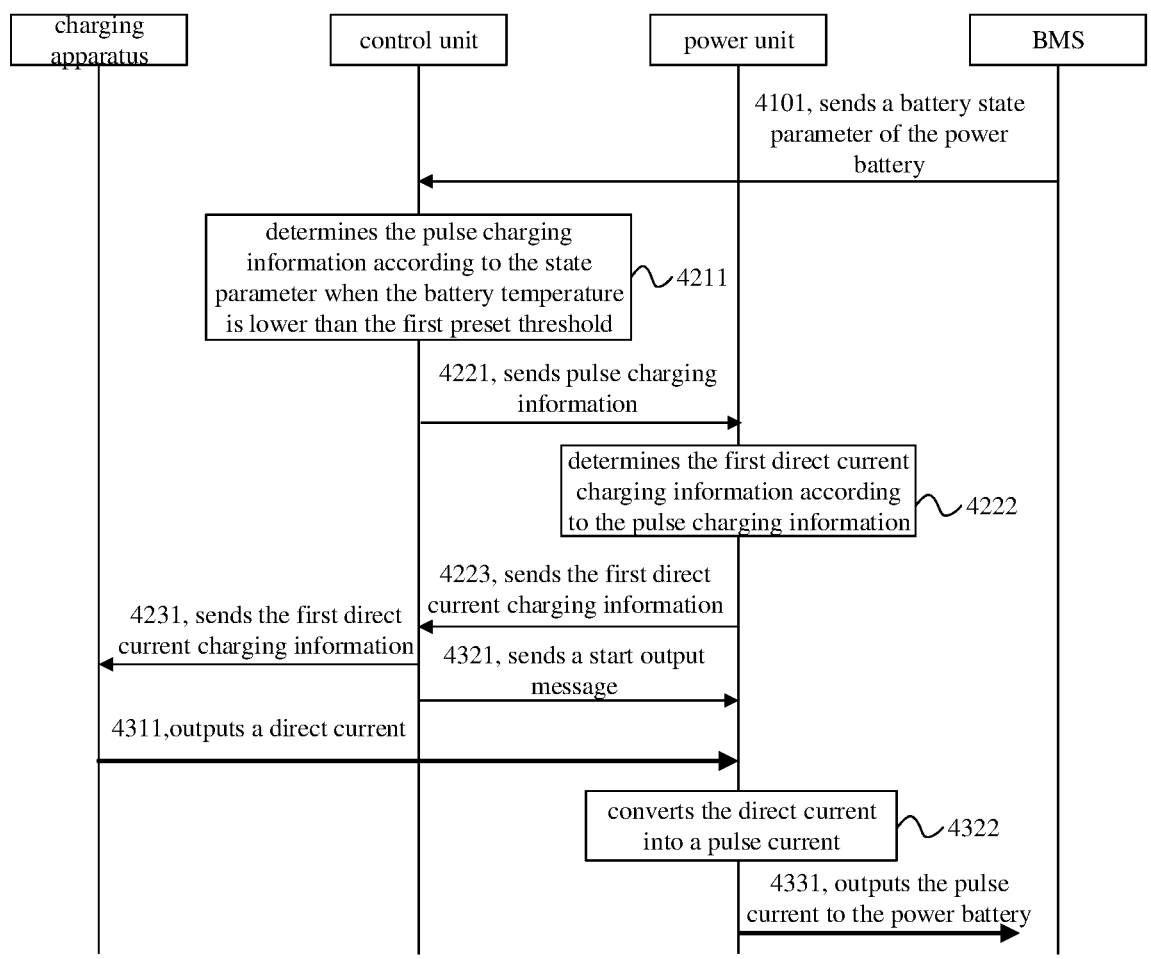
FIG. 12 is a schematic interaction flow diagram of the charging method disclosed in another embodiment of the present application.

Referring back to the charging method 400 shown in FIG. 7, FIG. 12 shows another schematic flow diagram of the charging method 400 provided by an embodiment of the present application.

As shown in FIG. 12, the above step 410 may include step 4101: the battery management system (BMS) sends a battery state parameter of the power battery to the control unit, where the state parameter includes a battery temperature and a battery state of charge.

Optionally, the battery management system (BMS) can also send other parameters such as a battery voltage of the power battery to the control unit.

Optionally, in the embodiment of the present application, the battery temperature of the power battery may be sent to the control unit via power storage battery state information message (BSM), and parameters such as the battery state of charge (SOC), the battery voltage of the power battery may be sent to the control unit via the battery charge state message (BCS).

The above step 421 may include step 4211: the control unit determines the pulse charging information according to the state parameter when the battery temperature is lower than the first preset threshold.

Specifically, in this step, when the battery temperature is lower than the first preset threshold, the pulse charging information jointly determined according to the battery temperature and the SOC by the control unit can be adapted to both the current temperature of the power battery and the SOC of the power battery.

Or, in another implementation of the step, when the battery temperature is lower than the first preset threshold and the battery voltage is lower than the second preset threshold, the control unit determines the pulse charging information according to the battery temperature and SOC jointly.

The above step 422 may include step 4221: the control unit sends pulse charging information to the power unit.

Optionally, there are many ways to realize that the control unit determines the pulse charging information according to the battery temperature and SOC. As an example, the mapping relationship of the battery temperature, the SOC and the pulse charging information may be determined, and the specific pulse charging information is determined according to the mapping relationship. Where the mapping relationship can be a mapping relationship acquired by fitting a large number of experimental data, and the mapping relationship has a high reliability and accuracy. In addition, in other examples, a special neural network model can be trained according to a large number of experimental data, and the neural network model can output pulse charging information according to the input battery temperature and SOC.

Step 4222: the power unit determines the first direct current charging information according to the pulse charging information.

Specifically, the power unit can determine the first direct current charging information corresponding to the pulse charging information according to the pulse charging information. The first direct current charging information may include at least one of the following information: charging demand voltage, charging demand current and charging demand mode. Where the charging demand mod can be a constant current mode or a constant voltage mode.

Step 4223: the power unit sends the first direct current charging information to the control unit.

The above step 423 may include step 4231: the control unit sends the first direct current charging information to the charging apparatus.

Specifically, the control unit retransmits the first direct current charging information received from the power unit to the charging apparatus.

Optionally, in some implementations, the first direct current charging information can be sent to the charging apparatus as the charging demand of BMS. Optionally, the control unit may send the first direct current charging information via the battery charging demand (BCL) message. Or, in other implementations, the first direct current charging information can also be sent to the charging apparatus via other messages, the embodiment of present application does not specifically limit the message type and the sending method.

The above step 431 may include step 4311: the charging apparatus outputs a direct current to the power unit.

The above step 432 may include step 4321: the control unit sends a start output message to the power unit.

Specifically, the start output message is configured to indicate the power unit to start operation, so as to realize subsequent step 4322.

Step 4322: the power unit converts the direct current into a pulse current.

The above step 433 may include step 4331: the power unit outputs the pulse current to the power battery.

Specifically, specific embodiments of the present application can be found in the description of the charging method 400 shown in FIG. 7 above, and for the sake of brevity, no more specific details will be given here.

Figure 13:
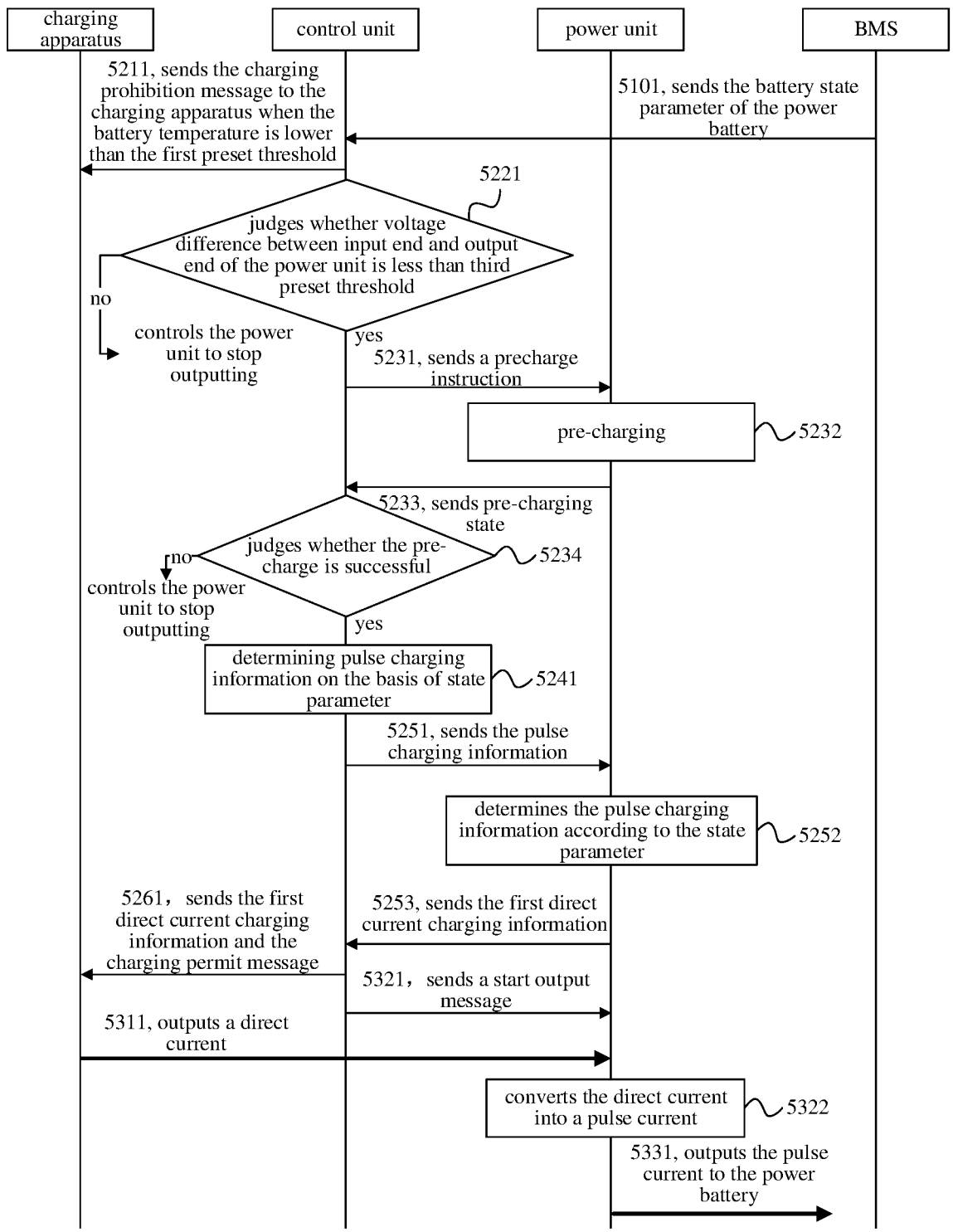
FIG. 13 is a schematic interaction flow diagram of the charging method disclosed in another embodiment of the present application.

Referring back to the charging method 500 shown in FIG. 8, FIG. 13 shows another schematic flowchart diagram of the charging method 500 provided by an embodiment of the present application.

As shown in FIG. 13, the above step 510 may include step 5101: the battery management system (BMS) sends the battery state parameter of the power battery to the control unit, where the state parameter includes the battery temperature and the battery state of charge.

The above step 521 may include step 5211: the control unit sends the charging prohibition message to the charging apparatus when the battery temperature is lower than the first preset threshold.

Optionally, in another embodiment of this step, when the battery temperature is lower than the first preset threshold and the battery voltage is lower than the second preset threshold, the control unit sends the charging prohibition message to the charging apparatus.

Optionally, before step 5211, the control unit may send a battery charging demand (BCL) message to the charging apparatus. Specifically, in the demand message, the demand voltage may be a total voltage of the power battery, the demand current is set as minimum current of the charging apparatus that can be output, for example, a current value of 10A.

The above step 522 may include step 5221: the control unit acquires the voltage difference between input end and output end, and judge whether the voltage difference is less than the third preset threshold.

Optionally, in this step, in the process that the control unit switch the charging mode of the power unit from the direct current charging mode to the pulse charging mode, the switch control of the relay is involved. When the voltage difference between the input end and the output end of the power unit is too large, it is easy to cause damage to the relay and affect the normal operation of the power conversion apparatus. Therefore, in order to protect the relay and ensure the performance of the power conversion apparatus, before controlling the relay switch, the control unit may also acquire the voltage difference between the input end and the output end of the power unit, and judge whether the voltage difference is less than the third preset threshold. If the voltage difference is less than the third preset threshold, the control unit executes the subsequent action, If the voltage difference is not less than the third preset threshold, the control unit controls the power unit to stop outputting, or, it can also wait for a period of time until the voltage difference is less than the third preset threshold.

Optionally, in some implementations, the control unit may directly detect the voltage difference between the input end and the output end of the power unit, or, in some other implementations, the control unit may receive the voltage value sent by the power battery and the voltage value sent by the charging apparatus, and the control unit uses the voltage value sent by the power battery as the voltage of the output end of the power unit, and the voltage value sent by the charging apparatus as the voltage of the input end of the power unit.

Specifically, if the charging mode of the power unit is switched from the direct current charging mode to the pulse charging mode, when the voltage difference between the input end and the output end of the power unit is less than the third preset threshold, the relay state in the power conversion apparatus changes. For example, the second relay K2 and the third relay K3 in FIG. 2 are closed, and the power unit is electrically connected with the charging apparatus and the power battery.

The above step 523 may include the following steps.

Step 5231: the control unit sends a precharge instruction to the power unit.

Step 5232: the power unit conducts a pre-charging.

Step 5233: the power unit sends its pre-charging state to the control unit.

Step 5234: the control unit judges whether the power unit is pre-charged successfully.

After the charging apparatus stops outputting direct current and the second relay K2 and the third relay K3 are closed, the control unit sends a pre-charge instruction to the power unit. The power unit starts the pre-charging according to the precharge instruction, and the pre-charging includes: charging the capacitor in the power unit.

During the pre-charging process of the power unit, the power unit sends its pre-charging state to the control unit in real time, and the control unit judges whether the pre-charging of the power unit is successful according to the pre-charging state. If it is successful, the control unit performs subsequent operations, and if it is unsuccessful, the control unit controls the power unit to stop outputting.

Further, if the pre-charging is successful, the control unit controls the first relay K1 in FIG. 2 to be disconnected, so as to disconnect the direct current connection between the charging apparatus and the power battery.

The above step 524 may include step 5241: the control unit determines the pulse charging information according to the state parameter.

The above step 525 may include the following steps.

Step 5251: the control unit sends the pulse charging information to the power unit.

Step 5252: the power unit determines the first direct current charging information according to the pulse charging information.

Step 5253: the power unit sends the first direct current charging information to the control unit.

The above step 526 may include step 5261: the control unit sends the first direct current charging information to the charging apparatus.

The above step 531 may include step 5311: the charging apparatus outputs a direct current to the power unit.

The above step 532 may include step 5321: the control unit sends a start output message to the power unit; step 5322: the power unit converts the direct current into a pulse current.

The above step 533 may include step 5331: the power unit outputs the pulse current to the power battery.

Specifically, specific embodiments of the present application can be found in the description of the charging method 500 shown in FIG. 8 above, and for the sake of brevity, no more specific details will be given here.

Figure 14:
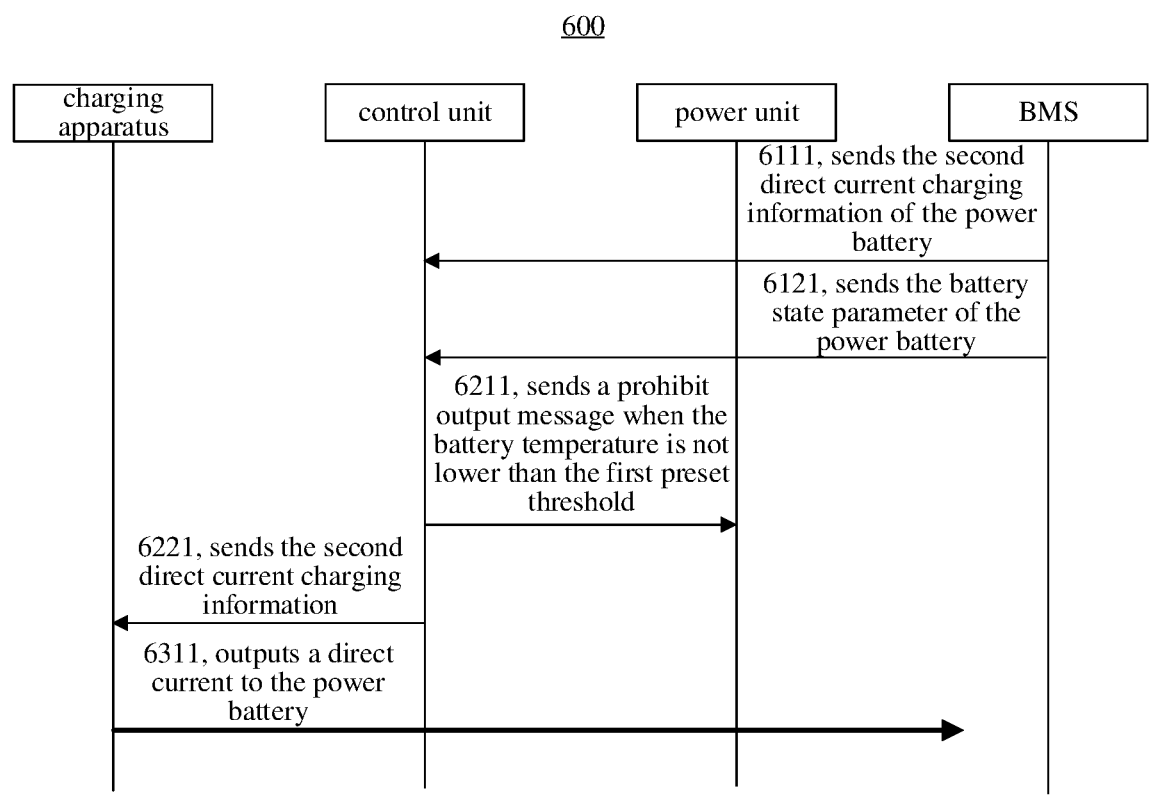
FIG. 14 is a schematic interaction flow diagram of the charging method disclosed in another embodiment of the present application.

Referring back to the charging method 600 shown in FIG. 9, FIG. 14 shows another schematic flowchart diagram of the charging method 600 provided by an embodiment of the present application.

As shown in FIG. 14, the above step 611 may include step 6111: the battery management system (BMS) sends the second direct current charging information of the power battery to the control unit.

Optionally, in some implementations, the battery management system (BMS) may send the second direct current charging information of the power battery to the control unit via the battery charging demand (BCL) message.

Or, in some other implementations, the first direct current charging information can also be sent to the control unit via other messages, the embodiment of the present application does not specifically limit the message type and sending method.

The above step 612 may include step 6121: the battery management system (BMS) sends the battery state parameter of the power battery to the control unit, where the state parameter includes the battery temperature and the battery state of charge.

Optionally, the battery management system (BMS) can also send other parameters such as the battery voltage of the power battery to the control unit.

The above step 621 may include step 6211: the control unit sends a prohibit output message to the power unit when the battery temperature is not lower than the first preset threshold.

Specifically, in this step, when the battery temperature is not lower than the first preset threshold, the control unit sends a prohibit output message to the power unit to control the power unit to stop outputting the pulse current.

Optionally, in another implementation of this step, when the battery temperature is not lower than the first preset threshold, or the battery voltage is not lower than the second preset threshold, the control unit sends an prohibit output message to the power unit to control the power unit to stop outputting the pulse current to the power battery.

Optionally, the prohibit output message may include multiple types. For example, it may include a pause output message and a stop output message, where, the pause output message is configured to indicate the power unit to stop outputting the pulse current temporarily, and in this the state, if the power unit receives a start output message, it may restore outputting the pulse current. But the stop output message is configured to indicate the capacitor in the power unit to execute the power-off and discharge process, and the power unit enters a sleep state.

Optionally, the prohibit output message and the start output message sent to the power unit by the control unit is carried via the message of the same type. As an example, in the message, the start output message is represented as "1", in the prohibit output message, the pause output message is represented as "2", the stop output message is represented as "3".

The above step 622 may include step 6221: the control unit sends the second direct current charging information to the charging apparatus.

The above step 631 may include step 6311: the charging apparatus outputs a direct current to the power battery through the power unit.

Specifically, in this step, by closing the first relay K1 in the power unit, the second relay K2 and the third relay K3 are disconnected, and a direct electrical connection between the charging apparatus and the power battery is realized, so that the charging apparatus outputs a direct current to the power battery through the power unit.

Figure 15:
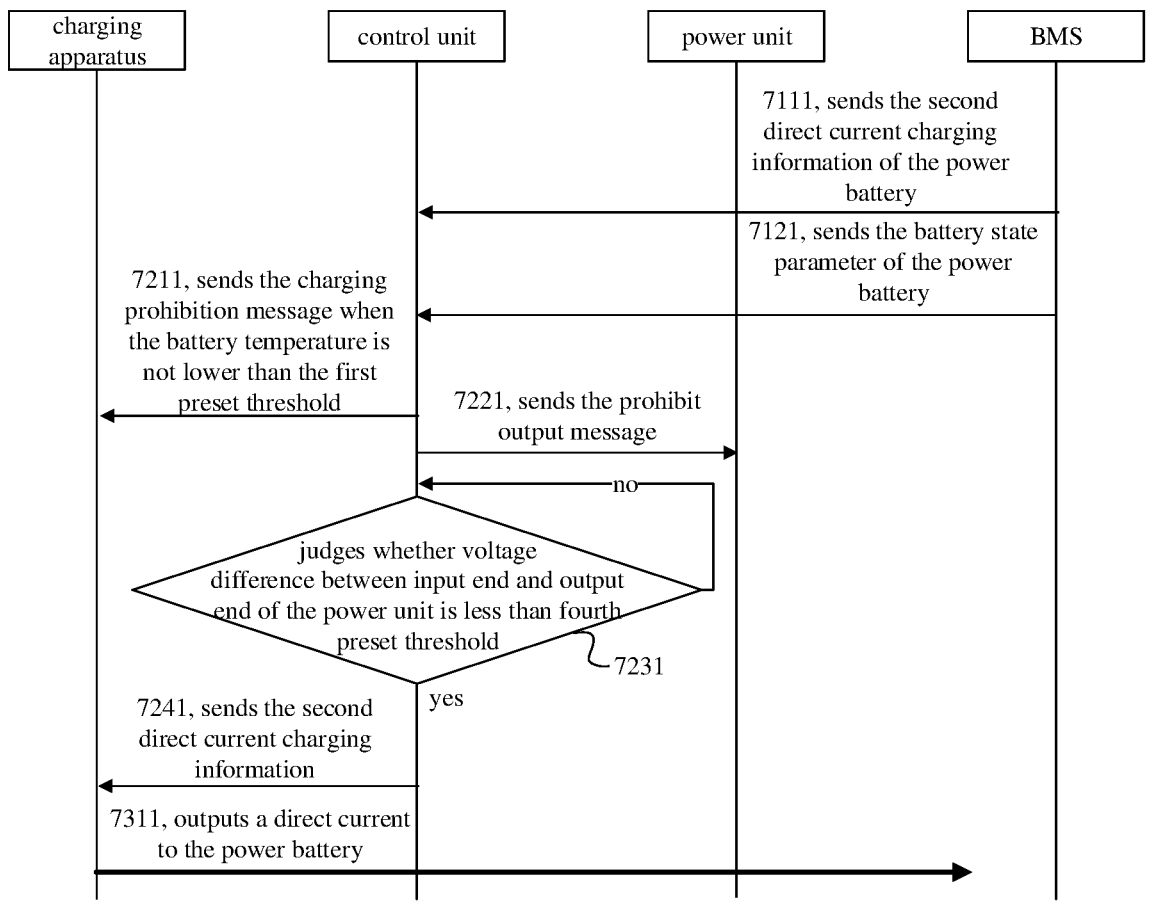
FIG. 15 is a schematic interaction flow diagram of the charging method disclosed in another embodiment of the present application.

Referring back to the charging method 600 shown in FIG. 10, FIG. 15 shows another schematic flowchart diagram of the charging method 700 provided by an embodiment of the present application.

As shown in 15, the above step 711 may include step 7111: the battery management system (BMS) sends the second direct current charging information of the power battery to the power conversion apparatus.

The above step 712 may include step 7121: the battery management system (BMS) sends the battery state parameter of the power battery to the control unit, where the state parameter includes the battery temperature and the battery state of charge.

Optionally, the battery management system (BMS) can also send other parameters such as the battery voltage of the power battery to the control unit.

The above step 721 may include step 7211: the control unit sends the charging prohibition message to the charging apparatus when the battery temperature is not lower than the first preset threshold.

Optionally, in another implementation of this step, when the battery temperature is not lower than the first preset threshold or the battery voltage is not lower than the second preset threshold, the control unit sends the charging prohibition message to charging apparatus.

Optionally, before step 7211, the control unit may send a battery charging demand (BCL) message to the charging apparatus. Specifically, in the demand message, the demand voltage may be a total voltage of the power battery, the demand current is set as the minimum current of the charging apparatus that can be output, for example, a current value of 10A.

The above step 722 may include step 7221: the control unit sends the prohibit output message to the power unit.

Specifically, the control unit sends the prohibit output message to the power unit, so as to control the power unit to stop outputting the pulse current.

Optionally, the related technical solution of this step can refer to the related description of step 6211 in above FIG. 14, and it will not be repeated here.

The above step 723 may include step 7231: the control unit acquires the voltage difference between the input end and the output end of the power unit, and judges whether the voltage difference is less than the fourth preset threshold.

If the voltage difference is less than the fourth preset threshold, the control unit continues to execute the subsequent action. If the voltage difference is not less than the fourth preset threshold, the control unit may continue to wait until the voltage difference is less than the fourth preset threshold. In this case, if the wait time of the control unit is larger than a certain threshold, the control unit may send a charging stop message to the power unit so that the capacitor in the power unit performs power-off and discharge.

Specifically, when the voltage difference between the input end and the output end of the power unit is less than the fourth preset threshold, the relay state in the power conversion apparatus changes. For example, the first relay K1 in FIG. 2 is closed, the second relay K2 and the third relay K3 are disconnected, so as to disconnect the electrical connection of the power unit with the charging apparatus, and the electrical connection of the power unit with the power battery. The charging apparatus and the power battery are directly electrically connected.

Further, when the voltage difference between the input end and the output end of the power unit is less than the fourth preset threshold, and the first relay K1 is closed, the following step 7241 is executed.

The above step 724 may include step 7241: the control unit sends the second direct current charging information and a charging permission message to the charging apparatus.

The above step 731 may include step 7311: the charging apparatus outputs a direct current to the power battery through the power unit.

It should be noted that in this application, in addition to providing a charging method with a power conversion apparatus as the execution body, a charging method with a charging apparatus and a BMS as the execution body is also provided. Specifically, the charging method with the charging apparatus and the BMS as the execution body may correspond to the relevant descriptions of the above method embodiments, which will not be described in detail herein.

Specific embodiments of the charging method provided by the present application have been described above with reference to FIGS. 3 to 15, and the specific embodiments of the charging apparatus provided by the present application will be described below with reference to FIGS. 16 to 18. It is understood that the related description in the following embodiments can refer to the foregoing embodiments and will not be repeated here for the sake of brevity.

Figure 16:
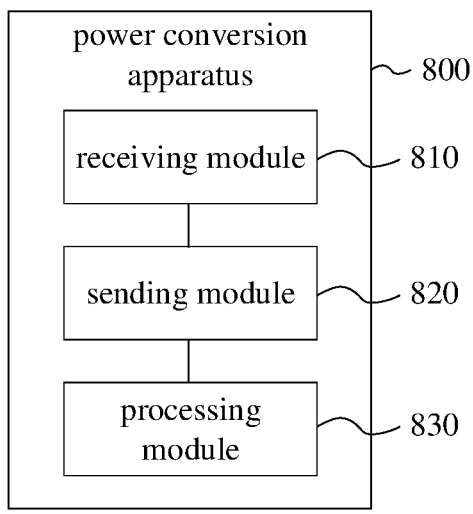
FIG. 16 is a schematic block diagram of a power conversion apparatus disclosed in one embodiment of the present application.

FIG. 16 shows a schematic structure diagram of power conversion apparatus 800 of an embodiment of the present application. As shown in FIG. 16, the power conversion apparatus 800 includes: a receiving module 810, a sending module 820 and a processing module 830.

In one embodiment of the present application, the receiving module 810 is configured to receive the state parameter of the power battery, the state parameter includes the battery temperature; the processing module 830 is configured to set the charging mode to the pulse charging mode when the battery temperature is lower than the first preset threshold; the processing module 830 is configured to convert the charging power of the charging apparatus and then charge the power battery in the pulse charging mode, the pulse charging mode is a charging mode which output pulsed voltage or pulsed current.

Optionally, the processing module 830 is also configured to: switch the charging mode from pulse charging mode to direct current charging mode when the battery temperature is not lower than the first preset threshold; the processing module 830 transmits the charging power of the charging apparatus to the power battery to charge the power battery in the direct current charging mode, where the direct current charging mode is a charging mode which outputs a constant voltage or a constant current.

Optionally, the state parameter also includes a battery voltage; the processing module 830 is configured to set the charging mode to the pulse charging mode when the battery temperature is lower than the first preset threshold and the battery voltage is lower than the second preset threshold.

Optionally, the state parameter also includes a battery voltage, the processing module 830 is configured to switch the charging mode from the pulse charging mode to the direct current charging mode when the battery temperature is not lower than the first preset threshold or the battery voltage is not lower than the second preset threshold.

In the processing that the processing module 830 is configured to set the charging mode to the pulse charging mode, optionally, the state parameter also includes a battery state of charge; the sending module 820 is configured to send first direct current charging information to the charging apparatus, the first direct current charging information is determined by the processing module 830 according to the pulse charging information, where the pulse charging information include at least one of the following information: pulse current information, pulse voltage information, pulse direction information, pulse frequency information and pulse time information. The pulse charging information is determined by the processing module 830 according to the battery temperature and battery state of charge. In the pulse charging mode, the processing module 830 is configured to output the pulse current to the power battery, where the pulse current is generated by converting a direct current based on the pulse charging information, the direct current is a direct current output to t the processing module 830 by the charging apparatus according to the first direct current charging information.

Optionally, before the processing module 830 sets the charging mode to the pulse charging mode, the sending module 820 is also configured to send a charging prohibition message to the charging apparatus, where the charging prohibition message is configured to indicate the charging apparatus to stop outputting direct current to processing module 830.

Optionally, after the sending module 820 is configured to send the charging prohibition message to the charging apparatus, the processing module 830 is also configured to conduct a pre-charging.

Optionally, the processing module 830 is configured to acquire a voltage difference between its input end and output end; if the voltage difference is less than the third preset threshold, the processing module 830 conducts the pre-charging.

In the processing that the processing module 830 is configured to switch the charging mode from the pulse charging mode to the direct current charging mode. Optionally, the processing module 830 is configured to stop outputting a pulse current to the power battery. The receiving module 810 is also configured to receive second direct current charging information of the power battery, the sending module 820 is also configured to send the second direct current charging information to the charging apparatus; the processing module 830 is configured to output the direct current output by the charging apparatus according to the second direct current charging information to the power battery, to charge the power battery.

Optionally, before the processing module 830 is configured to stop outputting the pulse current to the power battery, the sending module 820 is also configured to send a charging prohibition message to the charging apparatus, the charging prohibition message is configured to indicate the charging apparatus to stop outputting the direct current to the power conversion apparatus.

Optionally, the processing module 830 is configured to acquire a voltage difference between its input end and output end; if the voltage difference is less than the fourth preset threshold, the processing module 830 is configured to output the direct current output by the charging apparatus according to the second direct current charging information to the power battery, to charge the power battery.

Optionally, the above state parameter of the power battery is a parameter acquired by the battery management system of the power battery.

Figure 17:
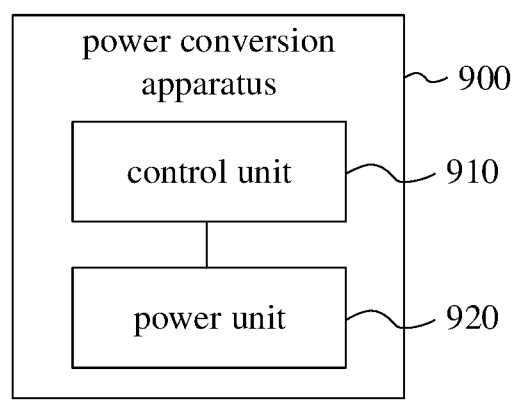
FIG. 17 is a schematic block diagram of the power conversion apparatus disclosed in another embodiment of the present application.

FIG. 17 shows a schematic diagram of a power conversion apparatus 900 according to another embodiment of the present application. As shown in FIG. 8, the power conversion apparatus 900 includes a control unit 910 and a power unit 920. Optionally, the control unit 910 may be the control unit 112 shown in FIG. 2, the power unit 920 may be the power unit 111 shown in FIG. 2, it may include the power conversion module, a first relay K1, a second relay K2 and a third relay K3 shown in FIG. 2.

Optionally, the power battery, the battery management system (BMS), and the charging apparatus in the following may correspond to the power battery 131, the BMS 132, and the charging apparatus 120 shown in FIG. 2.

Specifically, in the power conversion apparatus 900 provided by embodiments of the present application, the control unit 910 is configured to acquire the state parameter of the power battery, the state parameter includes the battery temperature of the power battery. The control unit 910 is configured to set the charging mode of the power unit 920 as the pulse charging mode when the battery temperature is lower than the first preset threshold. The power unit 920 is configured to convert charging power of the charging apparatus and then charge the power battery in the pulse charging mode, where the pulse charging mode is a charging mode using pulsed voltage or pulsed current.

Optionally, when the battery temperature is not lower than the first preset threshold, the control unit 910 is also configured to switch the charging mode of the power unit 920 from the pulse charging modes to the direct current charging mode. In the direct current charging mode, the power unit 920 is configured to transmit the charging power of the charging apparatus to the power battery to charge the power battery, where the direct current charging mode is a charging mode using a constant voltage or a constant current.

Optionally, the state parameter of the power battery acquired by the control unit 910 also includes the battery voltage, when the battery temperature is lower than the first preset threshold and the battery voltage is lower than the second preset threshold, the control unit 910 is configured to set the charging mode of the power unit 920 to the pulse charging mode.

Optionally, the state parameter of power battery acquired by the control unit 910 also includes the battery voltage, when the battery temperature is not lower than the first preset threshold or the battery voltage is not lower than the second preset threshold, the control unit 910 is configured to switch the charging mode of the power unit 920 from the pulse charging mode to the direct current charging mode.

In the process that the control unit 910 is configured to set the charging mode of the power unit 920 to the pulse charging mode, optionally, the state parameter also includes the battery state of charge; the control unit 910 is configured to determine the pulse charging information according to the battery temperature and the battery state of charge, and send the pulse charging information to the power unit 920. The pulse charging information includes at least one of the following information: pulse current, pulse voltage, pulse direction, pulse frequency and pulse time. The power unit 920 is configured to determine first direct current charging information corresponding to the pulse charging information according to the pulse charging information, and send the first direct current charging information to the control unit 910. The control unit 910 is configured to send the first direct current charging information to the charging apparatus, and control the power unit 920 to output pulse current to the power battery, where the pulse current is generated by converting a direct current based on the pulse charging information, and the direct current is a direct current output to the power unit 920 by the charging apparatus according to the first direct current charging information.

Optionally, before the control unit 910 is configured to set the charging mode of the power unit 920 to the pulse charging mode, the control unit 910 is also configured to send a charging prohibition message to the charging apparatus, where the charging prohibition message is configured to indicate the charging apparatus to stop outputting direct current to the power unit 920.

Optionally, after the control unit 910 is configured to send the charging prohibition message to the charging apparatus, the control unit 910 is also configured to send a precharge instruction to the power unit 920, and the power unit 920 is configured to conduct a pre-charging according to the pre-charge instruction.

Optionally, the power unit 920 is configured to acquire the voltage of its input end and the output end, and send the voltage of the input end and the output end to the control unit 910. If the voltage difference between the input end and the output end is less than the third preset threshold, the control unit 910 is configured to send the precharge instruction to the power unit 920.

In the process that the control unit 910 is configured to switch the charging mode of the power unit 920 from the pulse charging mode into the direct current charging mode, optionally, the control unit 910 is also configured to acquire second direct current charging information of the power battery. The second direct current charging information is a direct current charging information determined according to the state parameter of the power battery.

The control unit 910 is configured to control the power unit 920 to stop outputting the pulse current. The control unit 910 is configured to control the power unit 920 to output the direct current output by the charging apparatus according to the second direct current charging information to the power battery.

Optionally, before the control unit 910 is configured to control the power unit 920 to stop outputting the pulse current, the control unit 910 is also configured to send charging prohibition message to the charging apparatus, the charging prohibition message is configured to indicate the charging apparatus to stop outputting a direct current to the power unit 920.

Optionally, the control unit 910 is configured to acquire a voltage difference between input end and output end of the power unit 920; if the voltage difference is less than the fourth preset threshold, the control unit 910 is configured to control the power unit 920 to output the direct current output by the charging apparatus according to the second direct current charging information to the power battery.

Optionally, the above state parameter of the power battery is a parameter acquired by battery management system of the power battery.

Figure 18:
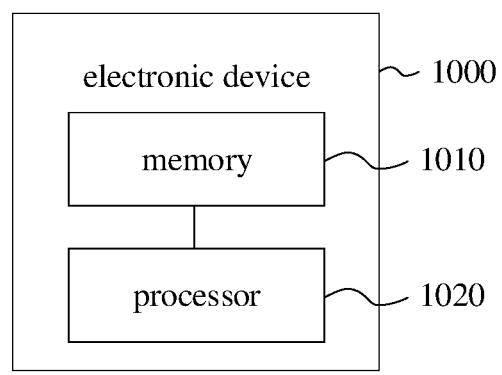
FIG. 18 is a schematic block diagram of the power conversion apparatus closed in another embodiment of the present application.

FIG. 18 shows a schematic diagram of an electronic device 1000 according to another embodiment of the present application. As shown in FIG. 18, the electronic device 1000 includes a memory 1010 and a processor 1020, where the memory 1010 is configured to store a computer program, the processor 1020 is configured to read the computer program and execute the aforementioned method according to various embodiments of the present application based on the computer program.

Optionally, the electronic device 1000 may be used for any one or more of the apparatus, the BMS and the power conversion apparatus. In the embodiment of the present application, except that the processor in the power conversion apparatus reads the corresponding computer program and executes the charging method corresponding to the power conversion apparatus in the foregoing various embodiments based on the computer program, the processor in the charging apparatus or the BMS can also read the corresponding computer program and execute the charging method corresponding to the charging apparatus or the BMS in the foregoing various embodiments based on the computer program.

In addition, the present application embodiments also provide a readable storage media configured to store a computer program, the computer program is configured to execute the method of aforementioned various embodiments of the present application. Optionally, the computer program may be a computer program in one or more apparatuses of the above-mentioned power conversion apparatus, the charging apparatus and the BMS.

It should be understood that the specific examples herein are only intended to assist those skilled in the art to better understand the embodiments of the present application and are not intended to limit the scope of the embodiments of the present application.

It should also be understood that in various embodiments of the present application, the serial number of each process does not mean the sequence of execution, and the execution sequence of each process should be determined by its function and internal logic, and should not constitute any limitation on the implementation process of the embodiments of the present application.

It should also be understood that the various embodiments described in this specification may be implemented individually or in combination, and the embodiments of this application are not limited thereto.

Although the present application has been described with reference to preferred embodiments various modifications may be made thereto and components therein may be replaced with equivalents without departing from the scope of the present application. In particular, the various technical features mentioned in the various embodiments may be combined in any manner so long as there is no structural conflict. The present application is not limited to the specific embodiments disclosed herein but includes all technical solutions falling within the scope of the claims.

What is claimed is:

1. A charging method, comprising:
acquiring a state parameter of a power battery by a power conversion apparatus, the state parameter comprising a battery temperature;
setting a charging mode to a pulse charging mode by the power conversion apparatus when the battery temperature is lower than a first preset threshold; and
converting charging power of a charging apparatus and then charging the power battery by the power conversion apparatus in the pulse charging mode, the pulse charging mode being a charging mode outputting a pulsed voltage or a pulsed current;
wherein before setting a charging mode to a pulse charging mode by the power conversion apparatus, the method further comprises: sending a battery charging demand message to the charging apparatus, the battery charging demand message comprising a demand current, the demand current being set as the minimum current of the charging apparatus that can be output;
wherein the charging apparatus and the power battery are connected with each other through a first relay, the power conversion apparatus is respectively connected to the charging apparatus and the power battery through a second relay and a third relay, and when the second relay and the third relay are both disconnected and the first relay is closed, the charging power output by the charging apparatus directly is transmitted to the power battery;

wherein the setting a charging mode to a pulse charging mode by the power conversion apparatus when the battery temperature is lower than a first preset threshold comprises:
controlling the second relay and the third relay to be closed and setting the charging mode to the pulse charging mode by the power conversion apparatus when the battery temperature is lower than the first preset threshold.

2. The method according to claim 1, wherein the state parameter further comprises: a battery voltage; and
the setting the charging mode to a pulse charging mode by the power conversion apparatus when the battery temperature is lower than the first preset threshold comprises:
setting the charging mode to the pulse charging mode by the power conversion apparatus when the battery temperature is lower than the first preset threshold and the battery voltage is lower than a second preset threshold.

3. The method according to claim 1, wherein the state parameter further comprises: a battery state of charge; and
the setting a charging mode to a pulse charging mode by the power conversion apparatus comprises:
sending first direct current charging information to the charging apparatus by the power conversion apparatus, the first direct current charging information being determined by the power conversion apparatus according to pulse charging information, wherein the pulse charging information comprises at least one of the following information: pulse current information, pulse voltage information, pulse direction information, pulse frequency information and pulse time information, the pulse charging information is determined by the power conversion apparatus according to the battery temperature and the battery state of charge;
the converting charging power of a charging apparatus and then charging the power battery by the power conversion apparatus in the pulse charging mode comprises:
outputting a pulse current to the power battery, wherein the pulse current is generated by converting a direct current based on the pulse charging information, the direct current is a direct current output to the power conversion apparatus by the charging apparatus according to the first direct current charging information.

4. The method according to claim 1, wherein before setting a charging mode to a pulse charging mode by the power conversion apparatus, the method further comprises:
sending a charging prohibition message to the charging apparatus by the power conversion apparatus, the charging prohibition message being configured to indicate the charging apparatus to stop outputting a direct current to the power conversion apparatus; and
after sending a charging prohibition message to the charging apparatus by the power conversion apparatus, the method further comprises:
conducting a pre-charging by the power conversion apparatus.

5. The method according to claim 4, wherein the conducting a pre-charging by the power conversion apparatus comprises:
acquiring a voltage difference between an input end and output end of the power conversion apparatus by the power conversion apparatus;
conducting a pre-charging by the power conversion apparatus under a condition that the voltage difference is less than a second preset threshold.

6. The method according to claim 1, wherein the method further comprises:
switching the charging mode from the pulse charging mode to a direct current charging mode by the power conversion apparatus when the battery temperature is not lower than the first preset threshold; and
transmitting the charging power of the charging apparatus to the power battery to charge the power battery by the power conversion apparatus in the direct current charging mode, wherein the direct current charging mode is a charging mode outputting constant voltage or constant current.

7. The method according to claim 6, wherein the state parameter further comprises: a battery voltage, and
the switching the charging mode from the pulse charging mode to a direct current charging mode by the power conversion apparatus when the battery temperature is not lower than the first preset threshold comprises:
switching the charging mode from the pulse charging mode to the direct current charging mode by the power conversion apparatus when the battery temperature is not lower than the first preset threshold or the battery voltage is not lower than a second preset threshold.

8. The method according to claim 6, wherein the switching the charging mode from the pulse charging mode to a direct current charging mode by the power conversion apparatus comprises:
stopping outputting a pulse current to the power battery by the power conversion apparatus;
acquiring second direct current charging information of the power battery and sending the second direct current charging information to the charging apparatus by the power conversion apparatus; and
the transmitting the charging power of the charging apparatus to the power battery to charge the power battery by the power conversion apparatus comprises:
outputting a direct current output by the charging apparatus according to the second direct current charging information to the power battery to charge the power battery by the power conversion apparatus.

9. The method according to claim 8, wherein before stopping outputting a pulse current to the power battery by the power conversion apparatus, the method further comprises:
sending a charging prohibition message to the charging apparatus by the power conversion apparatus, the charging prohibition message being configured to indicate the charging apparatus to stop outputting a direct current to the power conversion apparatus.

10. The method according to claim 9, wherein the outputting a direct current output by the charging apparatus according to the second direct current charging information to the power battery to charge the power battery by the power conversion apparatus comprises:
acquiring a voltage difference between an input end and an output end of the power conversion apparatus by the power conversion apparatus;
outputting the direct current output by the charging apparatus according to the second direct current charging information to the power battery to charge the power battery by the power conversion apparatus under a condition that the voltage difference is less than a second preset threshold.

11. A power conversion apparatus, comprising: a control unit and a power unit;

the control unit configured to acquire a state parameter of a power battery; the state parameter comprising a battery temperature of the power battery;

the control unit configured to set a charging mode of the power unit to a pulse charging mode when the battery temperature is lower than a first preset threshold, the power unit configured to convert charging power of a charging apparatus and then charge the power battery in the pulse charging mode, the pulse charging mode being a charging mode using pulsed voltage or pulsed current wherein before the control unit is configured to set the charging mode of the power unit to the pulse charging mode, the control unit is further configured to: send a battery charging demand message to the charging apparatus, the battery charging demand message comprising a demand current, the demand current being set as the minimum current of the charging apparatus that can be output;

wherein the charging apparatus and the power battery are connected with each other through a first relay, the power conversion apparatus is respectively connected to the charging apparatus and the power battery through a second relay and a third relay, and when the second relay and the third relay are both disconnected and the first relay is closed, the charging power output by the charging apparatus directly is transmitted to the power battery;

wherein the control unit is configured to:

control the second relay and the third relay to be closed and setting the charging mode to the pulse charging mode by the power conversion apparatus when the battery temperature is lower than the first preset threshold.

12. The power conversion apparatus according to claim 11, wherein the state parameter further comprises: a battery voltage, and the control unit is configured to set the charging mode of the power unit to the pulse charging mode when the battery temperature is lower than the first preset threshold and the battery voltage is lower than a second preset threshold.

13. The power conversion apparatus according to claim 11, wherein the state parameter further comprises: a battery state of charge;

the control unit is configured to determine pulse charging information according to the battery temperature and the battery state of charge, and send the pulse charging information to the power unit, the pulse charging information comprising at least one of following information: pulse current, pulse voltage, pulse direction, pulse frequency and pulse time;

the power unit is configured to determine first direct current charging information corresponding to the pulse charging information according to the pulse charging information, and send the first direct current charging information to the control unit; and the control unit is configured to send the first direct current charging information to the charging apparatus, and control the power unit to output a pulse current to the power battery, wherein the pulse current is generated by converting a direct current based on the pulse charging information, and the direct current is a direct current output to the power unit by the charging apparatus according to the first direct current charging information.

14. The power conversion apparatus according to claim 11, wherein before the control unit is configured to set the charging mode of the power unit to the pulse charging mode, the control unit is further configured to:

send a charging prohibition message to the charging apparatus, wherein the charging prohibition message is configured to indicate the charging apparatus to stop outputting a direct current to the power unit; and wherein after the control unit is configured to send a charging prohibition message to the charging apparatus, the control unit is further configured to send a precharge instruction to the power unit; and the power unit is configured to conduct a pre-charging according to the precharge instruction.

15. The power conversion apparatus according to claim 14, wherein the control unit is configured to acquire a voltage difference between an input end and an output end of the power unit; and under a condition that the voltage difference is less than a second preset threshold, the control unit is configured to send the precharge instruction to the power unit.

16. The power conversion apparatus according to claim 11, wherein when the battery temperature is not lower than the first preset threshold, the control unit is further configured to:

switch the charging mode of the power unit from the pulse charging mode to a direct current charging mode, and the power unit is configured to transmit the charging power of the charging apparatus to the power battery to charge the power battery in the direct current charging mode, wherein the direct current charging mode is a charging mode using a constant voltage or a constant current.

17. The power conversion apparatus according to claim 16, wherein the control unit is further configured to acquire second direct current charging information of the power battery;

the control unit is configured to control the power unit to stop outputting a pulse current; and the control unit is configured to control the power unit to output a direct current output by the charging apparatus according to the second direct current charging information to the power battery.

18. The power conversion apparatus according to claim 17, wherein before the control unit is configured to control the power unit to stop outputting a pulse current, the control unit is further configured to:

send a charging prohibition message to the charging apparatus, the charging prohibition message is configured to indicate the charging apparatus to stop outputting the direct current to the power unit.

19. The power conversion apparatus according to claim 18, wherein the control unit is configured to acquire a voltage difference between an input end and an output end of the power unit; and under a condition that the voltage difference is less than a second preset threshold, the control unit is configured to control the power unit to output the direct current output by the charging apparatus according to the second direct current charging information to the power battery.

20. A power conversion apparatus, comprising: a processor and a memory, the memory configured to store a computer program, the processor configured to call the computer program, to execute a charging method;

wherein the charging method comprises:

acquiring a state parameter of a power battery by the power conversion apparatus, the state parameter comprising a battery temperature;

setting a charging mode to a pulse charging mode by the power conversion apparatus when the battery temperature is lower than a first preset threshold; and converting charging power of a charging apparatus and then charging the power battery by the power conversion apparatus in the pulse charging mode, the pulse charging mode being a charging mode outputting a pulsed voltage or a pulsed current;

wherein before setting a charging mode to a pulse charging mode by the power conversion apparatus, the method further comprises: sending a battery charging demand message to the charging apparatus, the battery charging demand message comprising a demand current, the demand current being set as the minimum current of the charging apparatus that can be output;

wherein the charging apparatus and the power battery are connected with each other through a first relay, the power conversion apparatus is respectively connected to the charging apparatus and the power battery through a second relay and a third relay, and when the second relay and the third relay are both disconnected and the first relay is closed, the charging power output by the charging apparatus directly is transmitted to the power battery;

wherein the setting a charging mode to a pulse charging mode by the power conversion apparatus when the battery temperature is lower than a first preset threshold comprises:

controlling the second relay and the third relay to be closed and setting the charging mode to the pulse charging mode by the power conversion apparatus when the battery temperature is lower than the first preset threshold.

* * * * *